US012035032B2

United States Patent
Liu et al.

(10) Patent No.: US 12,035,032 B2
(45) Date of Patent: Jul. 9, 2024

(54) ELECTRONIC DEVICE, AND CONTROL METHOD FOR MOVABLE ASSEMBLY

(71) Applicant: Huawei Technologies Co., Ltd., Shenzhen (CN)

(72) Inventors: Shengcai Liu, Xi'an (CN); Shuqiang Gong, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 36 days.

(21) Appl. No.: 17/916,391

(22) PCT Filed: Mar. 12, 2021

(86) PCT No.: PCT/CN2021/080413
§ 371 (c)(1),
(2) Date: Sep. 30, 2022

(87) PCT Pub. No.: WO2021/197028
PCT Pub. Date: Oct. 7, 2021

(65) Prior Publication Data
US 2023/0156312 A1    May 18, 2023

(30) Foreign Application Priority Data
Apr. 2, 2020  (CN) .......................... 202010256780.1

(51) Int. Cl.
*H04N 23/57*  (2023.01)
*G01V 8/22*  (2006.01)
*H04N 23/63*  (2023.01)

(52) U.S. Cl.
CPC ............... *H04N 23/57* (2023.01); *G01V 8/22* (2013.01); *H04N 23/634* (2023.01)

(58) Field of Classification Search
CPC ......... G01S 17/08; G01V 8/22; G06F 1/1626; G06F 1/1686; H04M 1/0235;
(Continued)

(56) References Cited

U.S. PATENT DOCUMENTS 9,967,664 B1 *  5/2018  Quek .................... G01K 13/00
2006/0262183 A1  11/2006  Bestie et al.
(Continued)

FOREIGN PATENT DOCUMENTS

CN      207588983 U     7/2018
CN      208386725 U     1/2019
(Continued)

*Primary Examiner* — Amy R Hsu
(74) *Attorney, Agent, or Firm* — Conley Rose, P.C.

(57) ABSTRACT

An electronic device includes a movable assembly. An optical proximity sensor is disposed on the movable assembly. The movable assembly may be spaced from a fixed assembly on the electronic device, and the movable assembly can move on a plane that is disposed in parallel relative to the fixed assembly. A light intensity of light that is from the optical proximity sensor and that is reflected by the fixed assembly may reflect a position of the movable assembly relative to the fixed assembly. Whether the movable assembly moves to a specified target position may be determined based on the light intensity of the light that is reflected by the fixed assembly and that is detected by the optical proximity sensor.

20 Claims, 18 Drawing Sheets

(58) Field of Classification Search
CPC ............ H04M 1/0264; H04M 2250/12; H04N 23/57; H04N 23/634
See application file for complete search history.

(56) References Cited

U.S. PATENT DOCUMENTS

| | | | |
|---|---|---|---|
| 2012/0033233 A1* | 2/2012 | Kiyose | G01B 11/03 |
| | | | 356/615 |
| 2014/0110583 A1* | 4/2014 | Wu | H04M 1/72403 |
| | | | 250/340 |
| 2019/0297251 A1* | 9/2019 | Huang | H04M 1/0237 |
| 2019/0302842 A1 | 10/2019 | Sun et al. | |
| 2019/0346653 A1* | 11/2019 | Kang | G02B 7/026 |
| 2019/0373320 A1* | 12/2019 | Balsamo | G06F 8/61 |
| 2020/0126495 A1* | 4/2020 | Zhou | G06F 3/042 |

FOREIGN PATENT DOCUMENTS

| | | |
|---|---|---|
| CN | 208433993 U | 1/2019 |
| CN | 110132140 A | 8/2019 |
| JP | 2005136778 A | 5/2005 |
| JP | 2006245857 A | 9/2006 |
| JP | 2008538467 A | 10/2008 |
| JP | 2018082341 A | 5/2018 |
| JP | 2018148361 A | 9/2018 |
| JP | 2019187602 A | 10/2019 |
| WO | 2018236049 A1 | 12/2018 |

\* cited by examiner

ELECTRONIC DEVICE, AND CONTROL METHOD FOR MOVABLE ASSEMBLY

This is a U.S. National Stage of International Patent Application No. PCT/CN2021/080413 filed on Mar. 12, 2021, which claims priority to Chinese Patent Application No. 202010256780.1 filed on Apr. 2, 2020. Both of the aforementioned applications are hereby incorporated by reference in their entireties.

TECHNICAL FIELD

This application relates to the field of electronic devices, and more specifically, to an electronic device and a control method for a movable assembly.

BACKGROUND

A plurality of electronic components are usually disposed on an electronic device, to implement a plurality of functions. For example, one or more cameras may be disposed on the electronic device, to implement a photographing function. For another example, one or more microphones may be disposed on the electronic device, to implement a recording function. For still another example, one or more speakers may be disposed on the electronic device, to implement an audio playback function.

To reduce exposed electronic components on the electronic device, in a possible implementation, when an electronic component does not need to be used, the electronic component is disposed inside the electronic device; and when the electronic component needs to be used, the electronic component may be driven to be exposed outside the electronic device (in other words, a user can observe the electronic device from the outside of the electronic device), to implement a corresponding function. Therefore, a movable assembly may be disposed inside the electronic device. The movable assembly may be configured to: drive the electronic component to be exposed outside the electronic device, and retract the exposed electronic component inside the electronic device. A camera is used as an example. When a scene around the electronic device needs to be photographed, the movable assembly may drive the camera to move, so that the camera originally inside the electronic device is exposed outside the electronic device. After photographing ends, the movable assembly may retract the camera inside the electronic device.

For an existing solution for controlling movement of a movable assembly, a current specific position of the movable assembly is unknown. For example, in a possible solution for controlling movement of the movable assembly, a stopper is disposed at a position at which the movable assembly is ready to stay, and the movable assembly is driven to move. Once the movable assembly reaches the stopper, the movable assembly may stop moving forward due to blockage of the stopper, and finally the movable assembly stays at the position at which the movable assembly is ready to stay. However, a specific position of the movable assembly in a moving process is unknown. In other words, it is unknown whether the movable assembly can actually reach the stopper. The camera is still used as an example. If the movable assembly cannot reach the position at which the movable assembly is ready to stay, the camera cannot completely be exposed outside the electronic device, which may result in a relatively poor photographing effect.

SUMMARY

This application provides an electronic device and a control method for a movable assembly, to provide a new solution for controlling movement of a movable assembly. In the solution, a current relative position of the movable assembly can be determined to some extent.

According to a first aspect, an electronic device is provided, including a fixed assembly; a movable assembly, where there is a preset spacing distance between the movable assembly and the fixed assembly in a first direction, the movable assembly is movable on a target plane, the target plane is disposed in parallel relative to the fixed assembly, the target plane is disposed perpendicularly relative to the first direction, a movement displacement of the movable assembly includes a movement displacement in a second direction, the second direction is disposed perpendicularly relative to the first direction, and the second direction is disposed in parallel relative to the target plane; and a first optical proximity sensor, where the first optical proximity sensor is disposed on the movable assembly, the first optical proximity sensor emits light facing the fixed assembly and detects a light intensity of light incident on the first optical proximity sensor, the light incident on the first optical proximity sensor includes light that is from the first optical proximity sensor and that is reflected by the fixed assembly, and a light intensity of the light that is reflected by the fixed assembly and that is detected by the first optical proximity sensor is a first light intensity. When the movable assembly is located at a first movement position in the second direction, a value of the first light intensity is a first light intensity value. When the movable assembly is located at a second movement position in the second direction, a value of the first light intensity is a second light intensity value. The first movement position and the second movement position are staggered in the second direction, and the first light intensity value is different from the second light intensity value.

The fixed assembly may include one or more components that are relatively stationary in vision of a user. That the fixed assembly is relatively stationary in vision of the user may mean that the fixed assembly may not move in vision of the user when the user does not perform an action or does not move.

The movable assembly may include one or more components that are relatively movable in vision of the user. That the movable assembly is relatively movable in vision of the user may mean that the movable assembly can move in vision of the user when the user does not perform an action or does not move.

The movable assembly may further include, for example, a drive unit. The drive unit may drive the movable assembly to move relative to the fixed assembly. The drive unit may be considered as a power source for movement of the movable assembly. The drive unit may include, for example, a motor. The motor may be driven to rotate by powering on the motor, to drive the movable assembly to move.

That the target plane is disposed in parallel relative to the fixed assembly, described in this application, may indicate that an inclination angle of the target plane relative to the fixed assembly is less than a second target threshold. That is, the target plane needs to be disposed at least substantially (approximately) in parallel relative to the fixed assembly.

A movement manner of the movable assembly on the target plane may be a linear motion, a circular motion, or the like.

The first movement position is a marked position in the second direction. When the movable assembly stays at the first movement position, the first movement position may correspond to a current position of any point of the movable assembly in the second direction.

The second movement position is a marked position in the second direction. When the movable assembly stays at the second movement position, the second movement position may correspond to a current position of any point of the movable assembly in the second direction.

In this application, a spacing distance between the first optical proximity sensor and the fixed assembly in the first direction is relatively fixed, and the first optical proximity sensor moves in the second direction, so that a degree to which the fixed assembly blocks the light emitted by the first optical proximity sensor may change. Therefore, a position of the movable assembly relative to the fixed assembly in the second direction may be determined based on the first light intensity.

With reference to the first aspect, in some implementations of the first aspect, the first light intensity is used to determine a blocking angle of the first optical proximity sensor, and in a process in which the movable assembly moves from the first movement position to the second movement position, a displacement of the movable assembly in the second direction is determined by using the blocking angle and the spacing distance.

The blocking angle of the first optical proximity sensor may be a range angle of light that is blocked by the fixed assembly and that is from the first optical proximity sensor.

In this application, a displacement value corresponding to the first light intensity may be determined by using the first light intensity, and then the movable assembly may be controlled to perform a plurality of possible displacements based on the first light intensity. This helps improve flexibility of controlling the movable assembly.

With reference to the first aspect, in some implementations of the first aspect, the electronic device further includes an electronic component. The electronic component is disposed on the movable assembly, and movement of the movable assembly relative to the fixed assembly is used to expose the electronic component outside the electronic device, or is used to retract the exposed electronic component inside the electronic device. The first light intensity is greater than 0 and less than a maximum value of the first light intensity when a lowest position of the electronic component in the second direction is flush with a highest position of the fixed assembly in the second direction.

The electronic component may be, for example, a camera, a microphone, or a speaker.

The maximum value of the first light intensity may be a maximum value of a light intensity of light that is reflected by the fixed assembly and that is detected by the first optical proximity sensor in a complete stroke of the movable assembly.

In this application, in a case in which the first light intensity is greater than 0 and less than the maximum value of the first light intensity, it indicates that in a period of time before and after the case, the first light intensity may relatively accurately reflect a movement position of the movable assembly in the second direction. Therefore, the electronic component can be completely exposed outside the electronic device at a relatively proper position.

With reference to the first aspect, in some implementations of the first aspect, the electronic device further includes an electronic component. The electronic component is disposed on the movable assembly, and movement of the movable assembly relative to the fixed assembly is used to expose the electronic component outside the electronic device, or is used to retract the exposed electronic component inside the electronic device. A lowest position of the electronic component in the second direction is lower than a highest position of the fixed assembly in the second direction when the first light intensity reaches a maximum value of the first light intensity.

In this application, if the lowest position of the electronic component in the second direction is exposed, it indicates that a range in which the movable assembly continues moving upward is relatively limited. In this case, the first light intensity reaches the maximum value of the first light intensity, which indicates that all (or almost all, or basically all) of the light emitted by the first optical proximity sensor is irradiated on the fixed assembly. In a relatively short stroke of the movable assembly, light that is reflected by the fixed assembly and that is detected by the first optical proximity sensor may almost remain unchanged. Therefore, if a relative position between the first optical proximity sensor and the electronic component is set improperly, by using the first light intensity, the electronic component may not be able to be completely exposed outside the electronic device relatively accurately. For example, the movable assembly may generate an excessively large displacement, further resulting in problems that the movable assembly is easily broken, damaged, or the like.

With reference to the first aspect, in some implementations of the first aspect, the first light intensity is used to control the movable assembly to move to a first target position and a second target position, the first target position and the second target position are staggered in the second direction, the first light intensity reaches a first preset light intensity value when the movable assembly stays at the first target position, the first light intensity reaches a second preset light intensity value when the movable assembly stays at the second target position, and the first preset light intensity value is different from the second preset light intensity value.

The second target position is a marked position in the second direction. When the movable assembly stays at the second target position, the second target position may correspond to a current position of any point of the movable assembly in the second direction.

In this application, the movable assembly can be controlled, based on the first light intensity, to relatively accurately stay at two different positions, which improves convenience and flexibility of controlling the movable assembly.

With reference to the first aspect, in some implementations of the first aspect, the first light intensity is used to control the movable assembly to move to a first target position. The electronic device further includes a second optical proximity sensor. The second optical proximity sensor is disposed on the movable assembly, a position of the second optical proximity sensor in the second direction is different from a position of the first optical proximity sensor in the second direction, the second optical proximity sensor emits light facing the fixed assembly and detects a light intensity of light incident on the second optical proximity sensor, the light incident on the second optical proximity sensor includes light that is from the second optical proximity sensor and that is reflected by the fixed assembly, a light intensity of the light that is reflected by the fixed assembly and that is detected by the second optical proximity sensor is a second light intensity, the second light intensity is used to control the movable assembly to move to a second target position, and the first target position and the second target position are staggered in the second direction.

In this application, the movable assembly can be controlled, based on the first light intensity and the second light intensity, to relatively accurately stay at two different positions, which improves flexibility of controlling the movable assembly.

With reference to the first aspect, in some implementations of the first aspect, the electronic device further includes an ambient light sensor. The ambient light sensor is disposed on the movable assembly, the ambient light sensor is configured to detect a light intensity of an ambient environment of the ambient light sensor, and a position of the ambient light sensor is flush with a position of the first optical proximity sensor in the second direction.

That a position of the ambient light sensor is flush with a position of the first optical proximity sensor in the second direction may mean that a spacing between the center of the ambient light sensor and the center of the first optical proximity sensor in the second direction is less than a first target threshold.

In this application, the light intensity detected by the ambient light sensor can reflect a light intensity of external ambient light that is incident on the first optical proximity sensor. Therefore, a part of the light intensity detected by the first optical proximity sensor can be offset according to the light intensity detected by the ambient light sensor, which helps eliminate impact of the external ambient light, and further relatively accurately determines the first light intensity.

According to a second aspect, a movable assembly is provided. The movable assembly is configured to be disposed on an electronic device. There is a preset spacing distance between the movable assembly and a fixed assembly on the electronic device in a first direction, the movable assembly is movable on a target plane, the target plane is disposed in parallel relative to the fixed assembly, the target plane is disposed perpendicular relative to the first direction, a movement displacement of the movable assembly includes a movement displacement in a second direction, the second direction is disposed perpendicularly relative to the first direction, and the second direction is disposed in parallel relative to the target plane. The movable assembly includes a first optical proximity sensor. The first optical proximity sensor is configured to emit light facing the fixed assembly, and is configured to detect a light intensity of light incident on the first optical proximity sensor. The light incident on the first optical proximity sensor includes light that is from the first optical proximity sensor and that is reflected by the fixed assembly, and a light intensity of the light that is reflected by the fixed assembly and that is detected by the first optical proximity sensor is a first light intensity. When the movable assembly is located at a first movement position in the second direction, a value of the first light intensity is a first light intensity value. When the movable assembly is located at a second movement position in the second direction, a value of the first light intensity is a second light intensity value. The first movement position and the second movement position are staggered in the second direction, and the first light intensity value is different from the second light intensity value.

With reference to the second aspect, in some implementations of the second aspect, the first light intensity is used to determine a blocking angle of the first optical proximity sensor, and in a process in which the movable assembly moves from the first movement position to the second movement position, a displacement of the movable assembly in the second direction is determined by using the blocking angle and the spacing distance.

With reference to the second aspect, in some implementations of the second aspect, the movable assembly further includes an electronic component. Movement of the movable assembly relative to the fixed assembly is used to expose the electronic component outside the electronic device, or is used to retract the exposed electronic component inside the electronic device. The first light intensity is greater than 0 and less than a maximum value of the first light intensity when a lowest position of the electronic component in the second direction is flush with a highest position of the fixed assembly in the second direction.

With reference to the second aspect, in some implementations of the second aspect, the movable assembly further includes an electronic component. Movement of the movable assembly relative to the fixed assembly is used to expose the electronic component outside the electronic device, or is used to retract the exposed electronic component inside the electronic device. A lowest position of the electronic component in the second direction is lower than a highest position of the fixed assembly in the second direction when the first light intensity reaches a maximum value of the first light intensity.

With reference to the second aspect, in some implementations of the second aspect, the first light intensity is used to control the movable assembly to move to a first target position and a second target position, the first target position and the second target position are staggered in the second direction, the first light intensity reaches a first preset light intensity value when the movable assembly stays at the first target position, the first light intensity reaches a second preset light intensity value when the movable assembly stays at the second target position, and the first preset light intensity value is different from the second preset light intensity value.

With reference to the second aspect, in some implementations of the second aspect, the first light intensity is used to control the movable assembly to move to a first target position. The movable assembly further includes a second optical proximity sensor. A position of the second optical proximity sensor in the second direction is different from a position of the first optical proximity sensor in the second direction, the second optical proximity sensor emits light facing the fixed assembly and detects a light intensity of light incident on the second optical proximity sensor, the light incident on the second optical proximity sensor includes light that is from the second optical proximity sensor and that is reflected by the fixed assembly, a light intensity of the light that is reflected by the fixed assembly and that is detected by the second optical proximity sensor is a second light intensity, the second light intensity is used to control the movable assembly to move to a third target position, and the first target position and the third target position are staggered in the second direction.

With reference to the second aspect, in some implementations of the second aspect, the movable assembly further includes an ambient light sensor. The ambient light sensor is configured to detect a light intensity of an ambient environment of the ambient light sensor, and a position of the ambient light sensor is flush with a position of the first optical proximity sensor in the second direction.

According to a third aspect, a control method for a movable assembly is provided. The control method includes: controlling a movable assembly to move on a target plane, where the target plane is disposed in parallel relative to a fixed assembly, there is a preset spacing distance between the movable assembly and the fixed assembly in a first direction, the target plane is disposed perpendicularly relative to the first direction, a movement displacement of the movable assembly includes a movement displacement in a second direction, the second direction is disposed perpendicularly relative to the first direction, the second direction is disposed in parallel relative to the target plane, the movable assembly includes a first optical proximity sensor, the first optical proximity sensor is configured to emit light and detect a light intensity of light incident on the first optical proximity sensor, at least a part of the light emitted by the first optical proximity sensor is irradiated on the fixed assembly, and the light incident on the first optical proximity sensor includes light that is from the first optical proximity sensor and that is reflected by the fixed assembly; and controlling the movable assembly to stop moving when a first light intensity reaches a first preset light intensity value, so that the movable assembly stays at a first target position in the second direction, where the first light intensity is a light intensity of light that is detected by the first optical proximity sensor and that is reflected by the fixed assembly.

The fixed assembly may include one or more components that are relatively stationary in vision of a user. That the fixed assembly is relatively stationary in vision of the user may mean that the fixed assembly may not move in vision of the user when the user does not perform an action or does not move.

The movable assembly may include one or more components that are relatively movable in vision of the user. That the movable assembly is relatively movable in vision of the user may mean that the movable assembly can move in vision of the user when the user does not perform an action or does not move.

The movable assembly may further include, for example, a drive unit. The drive unit may drive the movable assembly to move relative to the fixed assembly. The drive unit may be considered as a power source for movement of the movable assembly. The drive unit may include, for example, a motor. The motor may be driven to rotate by powering on the motor, to drive the movable assembly to move.

That the target plane is disposed in parallel relative to the fixed assembly, described in this application, may indicate that an inclination angle of the target plane relative to the fixed assembly is less than a second target threshold. That is, the target plane needs to be disposed at least substantially (approximately) in parallel relative to the fixed assembly.

A movement manner of the movable assembly on the target plane may be a linear motion, a circular motion, or the like.

The first target position is a marked position in the second direction. When the movable assembly stays at the first target position, the first target position may correspond to a current position of any point of the movable assembly in the second direction.

In this application, a spacing distance between the first optical proximity sensor and the fixed assembly in the first direction is relatively fixed, and the first optical proximity sensor moves in the second direction, so that a degree to which the fixed assembly blocks the light emitted by the first optical proximity sensor may change. Therefore, the movable assembly may be controlled, based on the first light intensity, to move to the first target position in the second direction.

With reference to the third aspect, in some implementations of the third aspect, before the controlling the movable assembly to stop moving, the control method further includes: determining, based on the first light intensity, the movement displacement of the movable assembly relative to the fixed assembly in the second direction. The controlling the movable assembly to stop moving when a first light intensity reaches a first preset light intensity value includes: controlling the movable assembly to stop moving when the movement displacement reaches a target displacement threshold. The first light intensity reaches the first preset light intensity value when the movement displacement reaches the target displacement threshold.

In this application, a displacement value corresponding to the first light intensity may be determined by using the first light intensity, and then the movable assembly may be controlled to perform a plurality of possible displacements based on the first light intensity. This helps improve flexibility of controlling the movable assembly.

With reference to the third aspect, in some implementations of the third aspect, the determining, based on the first light intensity, the movement displacement of the movable assembly relative to the fixed assembly includes: determining a blocking angle of the first optical proximity sensor based on the first light intensity; and determining the movement displacement based on the blocking angle and the spacing distance.

The blocking angle of the first optical proximity sensor may be a range angle of light that is blocked by the fixed assembly and that is from the first optical proximity sensor.

In this application, a displacement of the movable assembly in the second direction can be relatively accurately determined by using the blocking angle and the spacing distance between the first optical proximity sensor and the fixed assembly in the first direction, which helps improve accuracy of controlling the movable assembly.

With reference to the third aspect, in some implementations of the third aspect, before the controlling the movable assembly to stop moving, the control method further includes: obtaining moving time of the movable assembly; and when the moving time exceeds a preset time threshold, determining that the movable assembly moves abnormally.

In this application, whether the movable assembly has moved for a relatively long time may be determined by timing movement of the movable assembly. If the first light intensity still does not reach the first preset light intensity value after long-time movement, it may indicate that the movement of the movable assembly is blocked. Therefore, the electronic device may check, based on the first light intensity and the moving time of the movable assembly, whether a current moving status of the movable assembly is abnormal. This can be considered as a closed-loop feedback function of the movable assembly.

With reference to the third aspect, in some implementations of the third aspect, the control method further includes: displaying target indication information. The target indication information indicates that the movable assembly moves abnormally.

In this application, the target indication information may be displayed, to clearly notify the user of a movement exception of the movable assembly, which helps restore normal running of the movable assembly as soon as possible.

With reference to the third aspect, in some implementations of the third aspect, before the controlling a movable assembly to move on a target plane that is disposed in parallel relative to a fixed assembly, the control method further includes: detecting a first operation. The controlling a movable assembly to move on a target plane that is disposed in parallel relative to a fixed assembly includes: controlling, according to the first operation, the movable assembly to move on the target plane.

The first operation may be, for example, an operation such as a gesture operation, a voice instruction, or a power-on operation.

In this application, the movable assembly is driven to move in response to the first operation, so that after performing the first operation, the user can sense that the electronic device drives the movable assembly to move, and then the user can perform a corresponding operation on the electronic device based on the moved movable assembly.

With reference to the third aspect, in some implementations of the third aspect, before the controlling a movable assembly to move on a target plane, the control method further includes: in response to a first operation, determining that the movable assembly is ready to stay at the first target position. After the movable assembly stays at the first target position, the control method further includes: in response to a second operation, determining that the movable assembly is ready to stay at a second target position; controlling the movable assembly to move on the target plane; and when the first light intensity reaches a second preset light intensity value, controlling the movable assembly to stop moving, so that the movable assembly stays at the second target position.

The second target position is a marked position in the second direction. When the movable assembly stays at the second target position, the second target position may correspond to a current position of any point of the movable assembly in the second direction.

In this application, the movable assembly can be controlled, based on the first light intensity, to relatively accurately stay at two different positions, which improves convenience and flexibility of controlling the movable assembly.

With reference to the third aspect, in some implementations of the third aspect, the movable assembly further includes a second optical proximity sensor. A position of the second optical proximity sensor in the second direction is different from a position of the first optical proximity sensor in the second direction, the second optical proximity sensor is configured to emit light and detect a light intensity of light incident on the second optical proximity sensor, at least a part of the light emitted by the second optical proximity sensor is irradiated on the fixed assembly, and the light incident on the second optical proximity sensor includes light that is from the second optical proximity sensor and is reflected by the fixed assembly. Before the controlling a movable assembly to move on a target plane, the control method further includes: in response to a first operation, determining that the movable assembly is ready to stay at the first target position. After the movable assembly stays at the first target position, the control method further includes: in response to a third operation, determining that the movable assembly is ready to stay at a third target position; controlling the movable assembly to move on the target plane; and when a second light intensity reaches a third preset light intensity value, controlling the movable assembly to stop moving, so that the movable assembly stays at the third target position, where the second light intensity is a light intensity of light that is reflected by the fixed assembly and that is detected by the second optical proximity sensor.

In this application, the movable assembly can be controlled, based on the first light intensity and the second light intensity, to relatively accurately stay at two different positions, which improves flexibility of controlling the movable assembly.

With reference to the third aspect, in some implementations of the third aspect, the movable assembly further includes an ambient light sensor. The ambient light sensor is configured to detect a light intensity of an ambient environment of the ambient light sensor, and a position of the ambient light sensor is flush with a position of the first optical proximity sensor in the second direction. Before the controlling the movable assembly to stop moving, the control method further includes: determining the first light intensity based on the light intensity detected by the first optical proximity sensor and the light intensity detected by the ambient light sensor.

That a position of the ambient light sensor is flush with a position of the first optical proximity sensor in the second direction may mean that a spacing between the center of the ambient light sensor and the center of the first optical proximity sensor in the second direction is less than a first target threshold.

In this application, the light intensity detected by the ambient light sensor can reflect a light intensity of external ambient light that is incident on the first optical proximity sensor. Therefore, a part of the light intensity detected by the first optical proximity sensor can be offset according to the light intensity detected by the ambient light sensor, which helps eliminate impact of the external ambient light, and further relatively accurately determines the first light intensity.

According to a fourth aspect, an electronic device is provided. The electronic device includes a control unit configured to control a movable assembly to move on a target plane. The target plane is disposed in parallel relative to a fixed assembly, there is a preset spacing distance between the movable assembly and the fixed assembly in a first direction, the target plane is disposed perpendicularly relative to the first direction, a movement displacement of the movable assembly includes a movement displacement in a second direction, the second direction is disposed perpendicularly relative to the first direction, the second direction is disposed in parallel relative to the target plane, the movable assembly includes a first optical proximity sensor, the first optical proximity sensor is configured to emit light and detect a light intensity of light incident on the first optical proximity sensor, at least a part of the light emitted by the first optical proximity sensor is irradiated on the fixed assembly, and the light incident on the first optical proximity sensor includes light that is from the first optical proximity sensor and that is reflected by the fixed assembly. The control unit is further configured to control the movable assembly to stop moving when a first light intensity reaches a first preset light intensity value, so that the movable assembly stays at a first target position in the second direction. The first light intensity is a light intensity of light that is detected by the first optical proximity sensor and that is reflected by the fixed assembly.

With reference to the fourth aspect, in some implementations of the fourth aspect, the control unit is further configured to: before controlling the movable assembly to stop moving, determine, based on the first light intensity, the movement displacement of the movable assembly relative to the fixed assembly in the second direction. The control unit is specifically configured to: control the movable assembly to stop moving when the movement displacement reaches a target displacement threshold. The first light intensity reaches the first preset light intensity value when the movement displacement reaches the target displacement threshold.

With reference to the fourth aspect, in some implementations of the fourth aspect, the control unit is specifically configured to: determine a blocking angle of the first optical proximity sensor based on the first light intensity; and determine the movement displacement based on the blocking angle and the spacing distance.

With reference to the fourth aspect, in some implementations of the fourth aspect, before controlling the movable assembly to stop moving, the control unit is further configured to: obtain moving time of the movable assembly; and when the moving time exceeds a preset time threshold, determine that the movable assembly moves abnormally.

With reference to the fourth aspect, in some implementations of the fourth aspect, the control unit is further configured to display target indication information. The target indication information indicates that the movable assembly moves abnormally.

With reference to the fourth aspect, in some implementations of the fourth aspect, the control unit is further configured to: before controlling the movable assembly to move on the target plane that is disposed in parallel relative to the fixed assembly, detect a first operation. The control unit is specifically configured to control, according to the first operation, the movable assembly to move on the target plane With reference to the fourth aspect, in some implementations of the fourth aspect, the control unit is further configured to: before controlling the movable assembly to move on the target plane, in response to a first operation, determine that the movable assembly is ready to stay at the first target position. After the movable assembly stays at the first target position, the control unit is further configured to: in response to a second operation, determine that the movable assembly is ready to stay at a second target position; control the movable assembly to move on the target plane; and when the first light intensity reaches a second preset light intensity value, control the movable assembly to stop moving, so that the movable assembly stays at the second target position.

With reference to the fourth aspect, in some implementations of the fourth aspect, the movable assembly further includes a second optical proximity sensor. A position of the second optical proximity sensor in the second direction is different from a position of the first optical proximity sensor in the second direction, the second optical proximity sensor is configured to emit light and detect a light intensity of light incident on the second optical proximity sensor, at least a part of the light emitted by the second optical proximity sensor is irradiated on the fixed assembly, and the light incident on the second optical proximity sensor includes light that is from the second optical proximity sensor and is reflected by the fixed assembly. Before controlling the movable assembly to move on the target plane, the control unit is further configured to: in response to a first operation, determine that the movable assembly is ready to stay at the first target position. After the movable assembly stays at the first target position, the control unit is further configured to: in response to a third operation, determine that the movable assembly is ready to stay at a third target position; control the movable assembly to move on the target plane; and when a second light intensity reaches a third preset light intensity value, control the movable assembly to stop moving, so that the movable assembly stays at the third target position, where the second light intensity is a light intensity of light that is reflected by the fixed assembly and that is detected by the second optical proximity sensor.

With reference to the fourth aspect, in some implementations of the fourth aspect, the movable assembly further includes an ambient light sensor. The ambient light sensor is configured to detect a light intensity of an ambient environment of the ambient light sensor. A position of the ambient light sensor is flush with a position of the first optical proximity sensor in the second direction. The control unit is further configured to: before controlling the movable assembly to stop moving, determine the first light intensity according to the light intensity detected by the first optical proximity sensor and the light intensity detected by the ambient light sensor.

According to a fifth aspect, a chip system is provided. The chip system includes at least one processor, and when program instructions are executed by the at least one processor, the chip system is enabled to implement the methods according to any one of the possible implementations of the third aspect.

According to a sixth aspect, a computer-readable storage medium is provided. The computer-readable storage medium stores program instructions. When the program instructions are run on a computer, the computer is enabled to perform instructions according to any one of the possible implementations of the third aspect.

DESCRIPTION OF EMBODIMENTS

The following describes technical solutions of this application with reference to accompanying drawings.

Terms used in the following embodiments are merely intended to describe specific embodiments, but are not intended to limit this application. The terms "one", "a" and "this" of singular forms used in this specification and the appended claims of this application are also intended to include expressions such as "one or more", unless otherwise specified in the context clearly. It should be further understood that in the following embodiments of this application, "at least one" and "one or more" mean one, two, or more. The term "and/or" is used to describe an association relationship between associated objects and represents that three relationships may exist. For example, A and/or B may represent the following cases: Only A exists, both A and B exist, and only B exists, where A and B each may be singular or plural. The character "/" usually indicates an "or" relationship between the associated objects.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

The following describes an electronic device according to embodiments of this application and embodiments for using such an electronic device. In some embodiments, the electronic device may be a portable electronic device that further includes other functions such as a personal digital assistant function and/or a music player function, for example, a mobile phone, a tablet computer, a wearable electronic device having a wireless communications function (for example, a smartwatch), or a video player. An example embodiment of the portable electronic device includes but is not limited to a portable electronic device using iOS®, Android®, Microsoft®, or another operating system. The portable electronic device may alternatively be another portable electronic device, such as a laptop computer (Laptop). It should also be understood that, in some other embodiments, the electronic device may not be a portable electronic device alternatively, but a desktop computer, a television (or a smart screen), a notebook computer, or the like.

Figure 1:
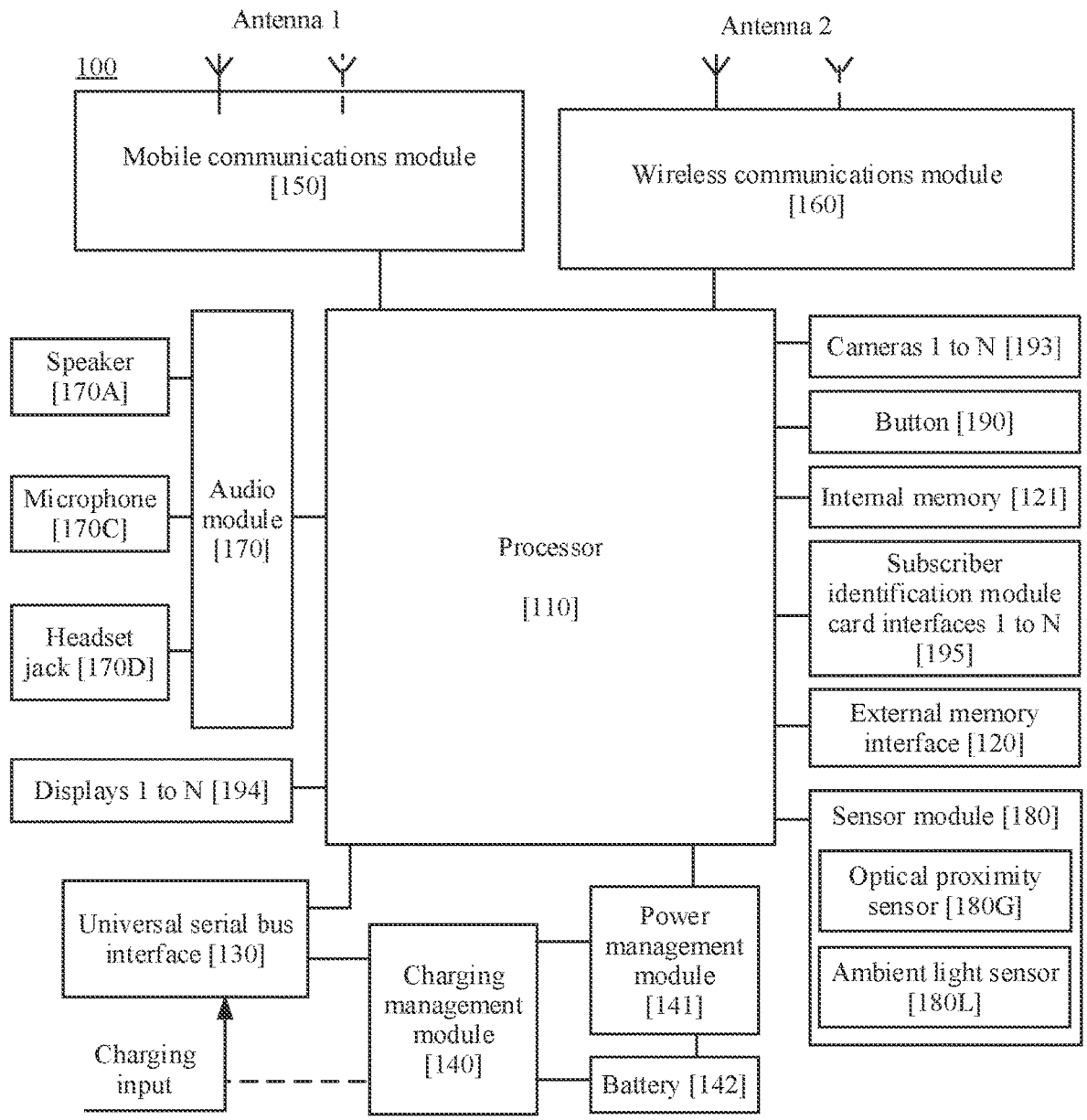
FIG. 1 is a schematic diagram of a hardware structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a microphone 170C, a headset jack 170D, a button 190, a camera 193, a display 194, a subscriber identification module (subscriber identification module, SIM) card interface 195, a sensor module 180, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. In some embodiments, the electronic device 100 may also include one or more processors 110. The controller may generate an operation control signal based on instruction operation code and a time sequence signal, to complete control of instruction fetching and instruction execution. In some other embodiments, a memory may further be disposed in the processor 110, to store instructions and data. For example, the memory in the processor 110 may be a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, thereby improving data processing or instruction execution efficiency of the electronic device 100.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM card interface, a USB interface, and/or the like. The USB interface 130 is an interface that complies with a USB standard specification, and may be specifically a mini USB interface, a micro USB interface, a USB Type-C interface, or the like. The USB interface 130 may be configured to connect to a charger to charge the electronic device 100, or may be configured to transmit data between the electronic device 100 and a peripheral device. The USB interface 130 may alternatively be configured to connect to a headset, and play audio by using the headset.

It may be understood that an interface connection relationship between the modules illustrated in embodiments of this application is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communications function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communications frequency bands. Different antennas may further be multiplexed to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules of the mobile communications module 150 may be disposed in the same device as at least some modules of the processor 110.

The wireless communications module 160 may provide a wireless communications solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like. The wireless communications module 160 may be one or more devices integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, or the like. The display 194 includes a display panel. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini light-emitting diode (mini light-emitting diode, MiniLED), a micro light-emitting diode (micro light-emitting diode, MicroLED), a micro organic light-emitting diode (micro organic light-emitting diode, Micro-OLED), a quantum dot light-emitting diode (quantum dot light-emitting diode, QLED), or the like. In some embodiments, the electronic device 100 may include one or more displays 194.

The display 194 of the electronic device 100 may be a flexible screen. Currently, the flexible screen attracts much attention because of unique features and huge potential of the flexible screen. Compared with a conventional display, the flexible display has features of strong flexibility and bendability, and can provide a user with a new bendability-based interaction mode, to satisfy more requirements of the user on the electronic device. For an electronic device configured with a foldable display, the foldable display of the electronic device may be switched between a small screen in a folded form and a large screen in an expanded form at any time. Therefore, the user uses a split-screen function more frequently on the electronic device configured with the foldable display.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or more cameras 193.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more video codecs. In this way, the electronic device 100 can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by drawing on a structure of a biological neural network, for example, by drawing on a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to be connected to an external memory card such as a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store one or more computer programs, and the one or more computer programs include instructions. The processor 110 may run the instructions stored in the internal memory 121, so that the electronic device 100 performs the screen-off display method provided in some embodiments of this application, various applications, data processing, and the like. The internal memory 121 may include a program storage area and a data storage area. The program storage area may store an operating system. The program storage area may further store one or more applications (for example, Gallery and Contacts), and the like. The data storage area may store data (for example, a photo and a contact) created during use of the electronic device 100, and the like. In addition, the internal memory 121 may include a high-speed random access memory, or may include a nonvolatile memory, for example, one or more magnetic disk storage devices, a flash memory device, or a universal flash storage (universal flash storage, UFS). In some embodiments, the processor 110 may run the instructions stored in the internal memory 121 and/or the instructions stored in the memory that is disposed in the processor 110, to enable the electronic device 100 to perform the screen-off display method provided in embodiments of this application, other applications, and data processing. The electronic device 100 may implement audio functions by using the audio module 170, the speaker 170A, the microphone 170C, the headset jack 170D, the application processor, and the like, for example, implement a music playback function and a recording function.

The sensor module 180 may include an optical proximity sensor 180G and an ambient light sensor 180L.

The optical proximity sensor 180G may include a light emitter and a light receiver. The light emitter is configured to emit light, and the light emitted by the light emitter may irradiate an obstacle in front of the light emitter. The light receiver may receive light reflected by the obstacle and detect a light intensity of light incident on the light receiver. The light intensity detected by the light receiver may reflect a distance between the obstacle and the optical proximity sensor 180G.

The ambient light sensor 180L may be configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The button 190 includes a power button, a volume button, and the like. The button 190 may be a mechanical button, or may be a touch button. The electronic device 100 may receive a button input, and generate a button signal input related to a user setting and functional control of the electronic device 100.

Figure 2:
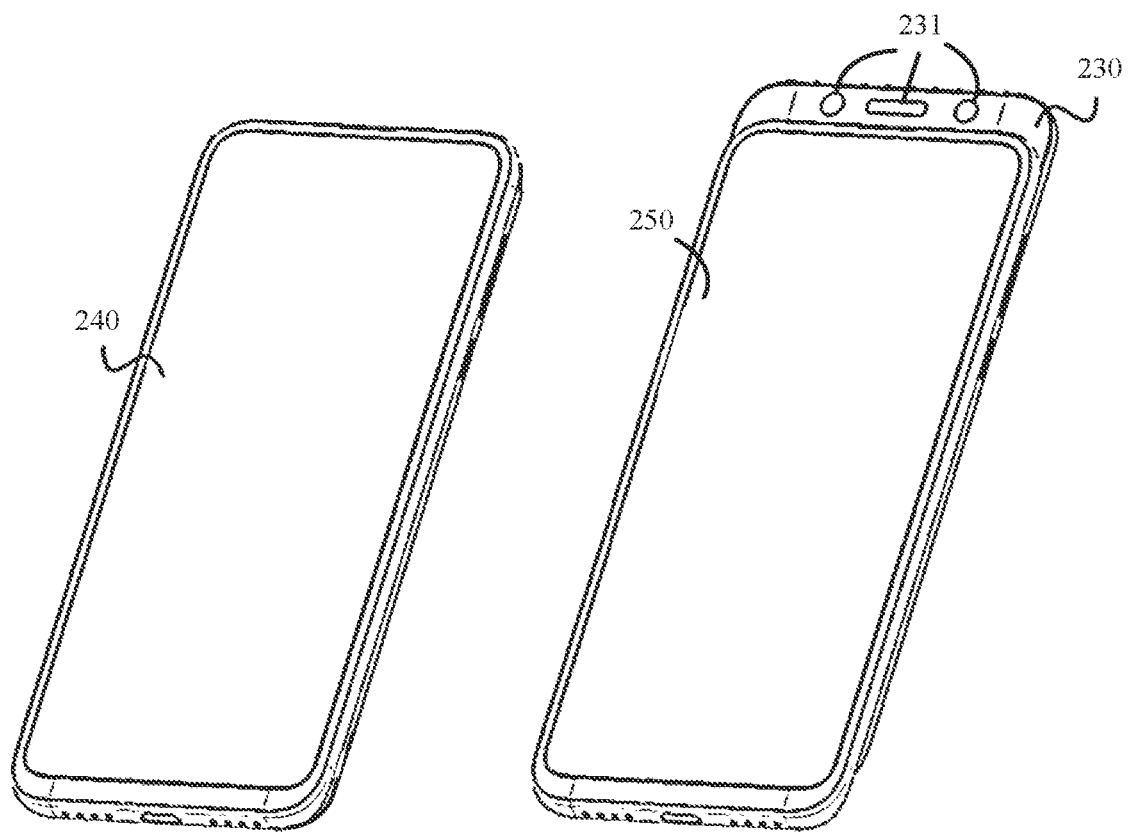
FIG. 2 is a schematic diagram of an appearance structure of an electronic device according to an embodiment of this application.
Figure 3:
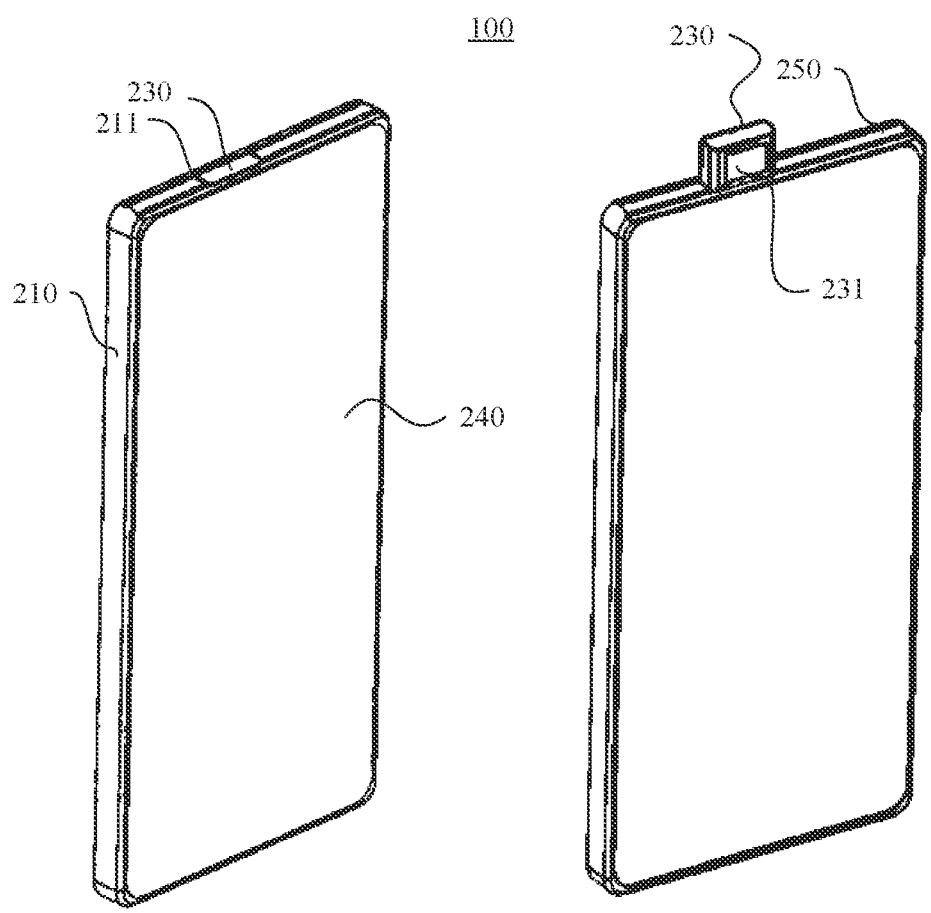
FIG. 3 is a schematic diagram of an appearance structure of an electronic device according to an embodiment of this application.
Figure 4:
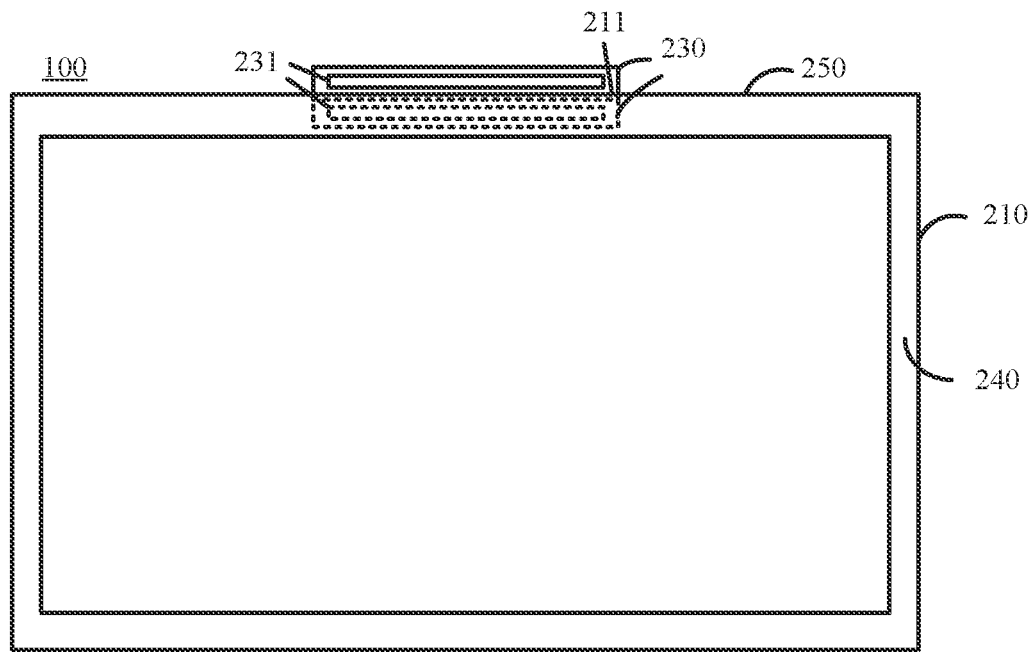
FIG. 4 is a schematic diagram of an appearance structure of an electronic device according to an embodiment of this application.

FIG. 2 to FIG. 4 show schematic diagrams of structures of an electronic device according to embodiments of this application. As shown in FIG. 2 and FIG. 3, the electronic device 100 may be, for example, a mobile phone. As shown in FIG. 4, the electronic device 100 may be, for example, a television (or a smart screen). For ease of understanding and description, in embodiments of this application, a surface that is on the electronic device 100 and that has a display is defined as a front surface 240; a surface that is on the electronic device 100, that is not provided with the display, and that is disposed in parallel relative to the display is defined as a rear surface; and a surface that is on the electronic device 100, that is located between the front surface 240 and the rear surface, and that intersects the front surface 240 and the rear surface is defined as a side surface 210. A movable assembly 230 is disposed on the electronic device 100.

As shown in FIG. 2, it is assumed that the electronic device 100 includes a fixed assembly 250 that is relatively fixed, and the movable assembly 230 can move relative to the fixed assembly 250. The fixed assembly 250 may include, for example, the display of the electronic device. The movable assembly 230 may include, for example, a rear cover of the electronic device 100, and the rear cover may be disposed in parallel relative to the display. Therefore, the rear cover may move relative to the display.

As shown in FIG. 3 and FIG. 4, it may be assumed that the electronic device includes a fixed assembly 250 that is relatively fixed, and the fixed assembly 250 includes at least the side surface 210 of the electronic device 100. The movable assembly 230 can move relative to the fixed assembly 250. The movable assembly 230 may be disposed at any position on the side surface 210 of the electronic device 100. The movable assembly 230 may be retracted inside the electronic device 100. A left figure in FIG. 3 is a schematic diagram in which the movable assembly 230 is hidden inside the electronic device 100. In FIG. 4, a dashed line indicates that the movable assembly 230 is hidden inside the electronic device 100. The movable assembly 230 may alternatively move to be extended outside the electronic device 100. A right figure in FIG. 3 is a schematic diagram in which the movable assembly 230 is extended outside the electronic device. In FIG. 4, a solid line indicates that the movable assembly 230 is extended outside the electronic device. A hole 211 is disposed in the side surface 210 of the electronic device 100, and the movable assembly 230 may be extended outside the electronic device 100 or be retracted inside the electronic device 100 through the hole 211. It should be understood that a quantity of installed movable assemblies 230 is not limited in embodiments of this application.

The movable assembly 230 may include a groove 231. The groove 231 may be disposed in an area that is of the movable assembly 230 and that can be exposed outside the electronic device and can also be accommodated inside the electronic device. The groove 231 may be configured to install an electronic component. An opening of the groove 231 may be disposed facing the front surface 240 of the electronic device 100, or may be disposed facing the rear surface of the electronic device 100. A shape of the groove 231 is not limited in embodiments of this application.

In a possible implementation, an electronic component originally disposed on the front surface 240 of the electronic device 100 may be disposed in the groove 231. For example, a front-facing camera may be disposed in the groove 231 to form a pop-up camera (or an elevating front camera). For another example, an earpiece may be disposed in the groove 231 to form a pop-up earpiece (or a lifting earpiece). For still another example, a sensor assembly may be disposed in the groove 231 to form a pop-up sensor assembly (or a lifting sensor assembly). Because the electronic component originally disposed on the front surface 240 of the electronic device 100 is disposed on the movable assembly 230, electronic components exposed outside the electronic device can be reduced (for example, space occupied by the electronic components on a screen is reduced, and a screen-to-body ratio of the electronic device 100 is increased).

It should be understood that, in embodiments of this application, there may be a plurality of similar descriptions about movement of the movable assembly 230, for example, extending and retracting, rising and falling, pop-up and withdrawal, a lifting motion, and a telescopic motion. All these descriptions may mean that the movable assembly 230 may move relative to the fixed assembly 250 of the electronic device 100 (for example, the display of the electronic device 100 or the side surface surrounding the display). A movement manner of the movable assembly 230 may include exposing (extending) outside the electronic device 100 or retracting inside the electronic device 100.

A power source of the movable assembly 230 is not limited in embodiments of this application. The power source of the movable assembly 230 may be, for example, a motor or a Hall device.

In a possible implementation, power required for the extending and retracting motions of the movable assembly 230 may be provided, for example, by a motor (not shown in FIG. 2 to FIG. 4) in the movable assembly 230. For example, the motor may be disposed inside the electronic device 100, and is fixed relative to the electronic device 100. The motor may be connected to the movable assembly 230 by using a lead screw and a push-pull sliding block. The motor drives the lead screw to rotate, and the push-pull sliding block in a threaded connection to the lead screw converts a rotation motion of the lead screw into a linear motion, to push the movable assembly 230 to be extended outside the electronic device or pull the movable assembly 230 to be retracted inside the electronic device.

Figure 5:
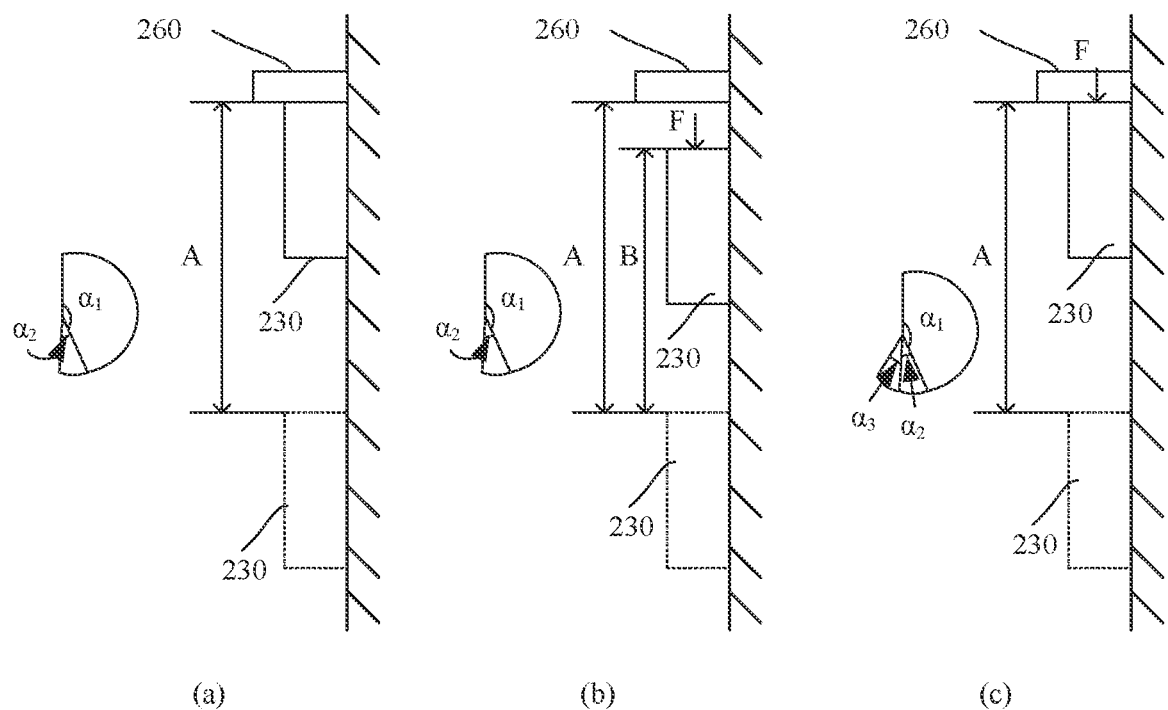
FIG. 5 shows schematic structural diagrams in which a movable assembly reaches a target position and the movable assembly does not reach the target position according to an embodiment of this application.

As shown in FIG. 5, it is assumed that the movable assembly 230 needs to move a distance A relative to the fixed assembly 250, to reach a target position. In FIG. 5, a dashed line indicates a position of the movable assembly 230 before movement. In FIG. 5, a solid line indicates a position at which the movable assembly 230 finally reaches under motor drive. A preset angular displacement that the motor is driven to rotate may be preset. The preset angular displacement may be converted into a linear displacement of the movable assembly 230, and a distance of the linear displacement is equal to A+x. The preset angular displacement may include a first partial angular displacement $\alpha_1$ and a second partial angular displacement $\alpha_2$. Without any blockage, the first partial angular displacement $\alpha_1$ may be converted to a line displacement of the distance A, and the second partial angular displacement $\alpha_2$ may be converted to a line displacement of a distance x. In addition, a stopper 260 may be disposed at the target position. First, as shown in (a) in FIG. 5, the motor rotates the first partial angular displacement UL so that the movable assembly 230 can move the distance A. It is assumed that in this case, the movable assembly 230 can reach the stopper 260. The movable assembly 230 may stay at the target position due to blocking of the stopper 260. The motor can continue rotating the second partial angular displacement $\alpha_2$, but the second partial angular displacement $\alpha_2$ is not converted into an actual displacement of the movable assembly 230. In addition, if the movable assembly 230 still does not reach the stopper 260 after the motor rotates the first partial angular displacement $\alpha_1$, the second partial angular displacement $\alpha_2$ can be converted into a linear displacement of the movable assembly 230, so that the movable assembly 230 can be pushed to reach the stopper 260.

However, this driving manner has some disadvantages. When the movable assembly 230 is under a relatively large resistance, the movable assembly 230 may not reach the stopper 260, as shown in (b) in FIG. 5. The motor needs to additionally rotate an angular displacement $\alpha_3$, so that the movable assembly 230 can move to the target position, as shown in (c) in FIG. 5. In this driving manner, an actual movement position of the movable assembly 230 cannot be learned, and therefore the motor cannot be driven to rotate an additional angular displacement. In addition, the movable assembly 230 cannot accurately stay at a plurality of positions. Moving flexibility of the movable assembly 230 is relatively poor.

In a possible implementation, for example, a Hall sensor (not shown in FIG. 2 to FIG. 4) in the movable assembly 230 may provide the power required for extending and retracting motions of the movable assembly 230. For example, the electronic device 100 may include a fixed magnet, and the fixed magnet is disposed on the fixed assembly 250. The movable assembly 230 may include the Hall sensor. The Hall sensor may be driven in a manner of powering on the Hall sensor, and the movable assembly 230 is driven to move.

The Hall sensor can also detect a magnetic flux with the fixed magnet. The magnetic flux reflects a distance between the Fall sensor and the fixed magnet. Therefore, a movement displacement of the movable assembly 230 may be determined by using the Hall sensor. In this driving manner, the movable assembly 230 may be driven to stay at a plurality of positions.

However, this driving manner has some disadvantages. According to a first aspect, the fixed magnet occupies relatively large space, so that the fixed magnet is not applicable to a light and thin electronic device. According to a second aspect, costs of the fixed magnet and the Hall sensor are relatively high. According to a third aspect, it is assumed that the Hall sensor moves in a second direction, a spacing between the Hall sensor and the fixed magnet in a first direction may significantly affect accuracy of a detection distance. Therefore, the movable assembly 230 cannot accurately stay at a plurality of positions, and movement accuracy of the movable assembly 230 is relatively poor.

Embodiments of this application provide a movable assembly and an electronic device, to relatively accurately and flexibly control movement of the movable assembly.

Figure 6:
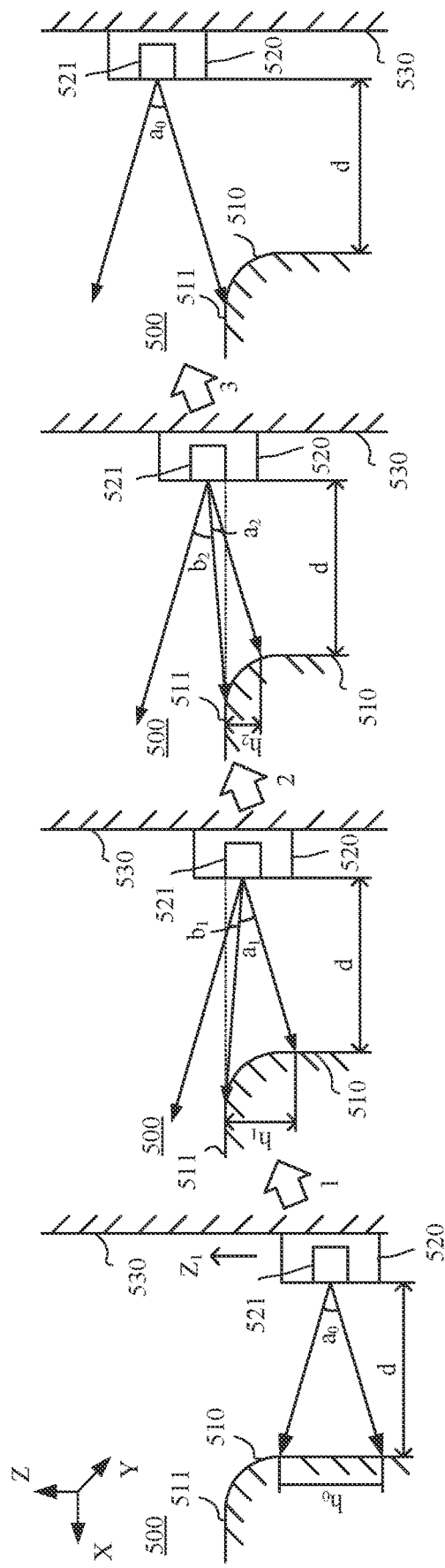
FIG. 6 is a schematic flowchart of movement of a movable assembly according to an embodiment of this application.

FIG. 6 is a schematic flowchart of movement of a movable assembly according to an embodiment of this application.

An electronic device 500 may include a fixed assembly 510. The fixed assembly 510 may include one or more components that are relatively stationary in vision of a user. That the fixed assembly is relatively stationary in vision of the user may mean that the fixed assembly 510 does not move in vision of the user when the user does not perform an action or does not move. Optionally, the fixed assembly 510 may be the fixed assembly 250 on the electronic device 100 shown in FIG. 2 to FIG. 4. For example, the fixed assembly 510 may be the side surface surrounding the display in FIG. 2. For another example, the fixed assembly 510 may be the side surface 210 of the electronic device 100 shown in FIG. 3 and FIG. 4.

The electronic device 500 may further include a movable assembly 520. The movable assembly 520 may include one or more components that are relatively movable in vision of the user. That the movable assembly is relatively movable in vision of the user may mean that the movable assembly 520 can move in vision of the user when the user does not perform an action or does not move. The movable assembly 520 may be, for example, the movable assembly 230 on the electronic device 100 shown in FIG. 2 to FIG. 4. The movable assembly 520 can move relative to the fixed assembly 510. Therefore, the fixed assembly 510 is a reference for the movable assembly 520.

There may be a preset spacing distance d between the movable assembly 520 and the fixed assembly 510 in a first direction. The movable assembly 520 can move on a target plane 530. The target plane 530 may be disposed perpendicularly relative to the first direction. The target plane 530 is disposed in parallel relative to the fixed assembly 510. A movement manner of the movable assembly 520 on the target plane 530 may be a linear motion, a circular motion, or the like. A movement manner of the movable assembly 520 is related to a moving track in which an electronic component is exposed outside the electronic device 500. A movement manner of the movable assembly 520 on the target plane 530 may not be limited in this application.

The movable assembly 520 may include a first optical proximity sensor 521, a drive unit (not shown in FIG. 6), and the electronic component (not shown in FIG. 6).

A spacing distance between the first optical proximity sensor 521 and the fixed assembly 510 is d. The spacing distance may be a distance between the first optical proximity sensor 521 and the fixed assembly 510 in the first direction. The first optical proximity sensor 521 may include a light emitter (not shown in FIG. 6) and a light receiver (not shown in FIG. 6). The light emitter is configured to emit light. The light receiver is configured to detect an intensity of light incident on the first optical proximity sensor 521. When an obstacle exists in front of the first optical proximity sensor 521, the obstacle may reflect light from the light emitter, and the light receiver may receive the light reflected by the obstacle. The light reflected by the obstacle may reflect a distance between the obstacle and the first optical proximity sensor 521 in the first direction.

The drive unit may drive the movable assembly 520 to move relative to the fixed assembly 510. By moving the movable assembly 520, the electronic component originally retracted inside the electronic device 500 may be exposed outside the electronic device 500, or the electronic component exposed outside the electronic device 500 may be retracted inside the electronic device 500.

A movement displacement of the movable assembly on the target plane 530 may include a movement displacement in a second direction. The second direction is disposed perpendicularly relative to the first direction, and the second direction is disposed in parallel relative to the target plane 530, for example, a direction $Z_1$ shown in FIG. 6.

The following describes a possible relationship among the first direction, the second direction, and the target plane with reference to an X-Y-Z coordinate system in FIG. 6. The first direction may be, for example, a direction parallel to an X-axis. The second direction may be, for example, a direction parallel to a Z-axis. The target plane may be, for example, disposed in parallel relative to a Y-Z plane.

In an example, the first direction may be a horizontal direction, and the second direction may be a perpendicular direction. In other words, there is a preset spacing distance between the movable assembly 520 and the fixed assembly 510 on a horizontal plane. The movable assembly 520 may move on a perpendicular plane perpendicular to the horizontal plane. For example, the movable assembly 520 may move up and down on the perpendicular plane.

In an example, the first direction may be a perpendicular direction, and the second direction may be a horizontal direction. In other words, there is a preset spacing distance between the movable assembly 520 and the fixed assembly 510 on a perpendicular plane. The movable assembly 520 may move on a horizontal plane perpendicular to the perpendicular plane. For example, the movable assembly 520 may move left and right on the horizontal plane.

In addition, the second direction described in this application may be defined in another form. For example, a direction in which the movable assembly 520 extends from inside to outside of the electronic device 500 may be defined as the second direction. For another example, a direction obtained by connecting a start position of the movable assembly 520 to a movement end position may be defined as the second direction. With the benefit of the guidance and enlightenment presented in the foregoing description and the related accompanying drawings, a person skilled in the art may figure out other forms of definitions related to the second direction. Therefore, it should be understood that this application is not limited to the disclosed specific embodiments.

In this application, a process in which the electronic component located inside the electronic device 500 is exposed outside the electronic device 500 is used as an example for description. For clarity of description, the following definition is made: In the process in which the electronic component is exposed outside the electronic device 500, the movable assembly 520 moves from bottom to top (or from low to high) in the second direction. In other words, in the second direction, a position that is relatively closer to an outer side of the electronic device 500 is upper (high), and a position that is relatively closer to an inner side of the electronic device 500 is lower (low). With the benefit of the guidance and enlightenment presented in the foregoing description and the related accompanying drawings, a person skilled in the art may figure out a process in which the electronic component exposed outside the electronic device 500 is retracted inside the electronic device 500. Details are not described in this application.

A figure on the left side of an arrow 1 in FIG. 6 shows a start position of the movable assembly 520 before movement.

The first optical proximity sensor 521 on the movable assembly 520 can emit light, and a total emission anile of the first optical proximity sensor 521 is a). A side that is of the first optical proximity sensor 521 and that is used to emit light may be a front surface of the first optical proximity sensor 521.

The front surface of the first optical proximity sensor 521 faces the fixed assembly 50. Light emitted by the first optical proximity sensor 521 may be irradiated on the fixed assembly 510. In other words, the fixed assembly 510 may be an obstacle in front of the first optical proximity sensor 521.

The fixed assembly 510 may reflect the light from the first optical proximity sensor 521 back to the first optical proximity sensor 521. In a possible case, light incident on the fixed assembly 510 may be diffusely reflected on the fixed assembly 510.

The first optical proximity sensor 521 may detect a light intensity of light that is incident on the first optical proximity sensor 521, and the light that is incident on the first optical proximity sensor 521 includes light reflected by the fixed assembly 510.

Because the movable assembly 520 does not move, most light emitted by the first optical proximity sensor 521 may be reflected back to the first optical proximity sensor 521 by the fixed assembly 510. Therefore, a range angle (referred to as a blocking angle of the first optical proximity sensor 521 for short below) of light blocked by the fixed assembly 510 may be $a_0$. Based on the spacing distance d between the fixed assembly 510 and the first optical proximity sensor 521 and the blocking angle $a_0$ of the first optical proximity sensor 521, a blocking height $h_0=2d \cdot \tan(a_0/2)$ of the fixed assembly 510 in the second direction may be obtained. It is assumed that in this case, a light intensity of the light that is reflected by the fixed assembly 510 and that is detected by the first optical proximity sensor 521 is I.

Subsequently, the movable assembly 520 continues moving upward, and moves to a first movement position. As shown in a figure between the arrow 1 and an arrow 2 in FIG. 6, the first movement position may be, for example, a position at which the first optical proximity sensor 521 is about to be exposed outside the electronic device 500.

A part of the light emitted by the first optical proximity sensor 521 may be irradiated on the fixed assembly 510, and the other part of the light cannot be irradiated on the fixed assembly 510. For example, a total emission angle of the first optical proximity sensor 521 is $a_0$, a blocking angle of the first optical proximity sensor 521 may be $a_1$, a range angle (referred to as an open angle of the first optical proximity sensor 521 below) of light that is not blocked by the fixed assembly 510 is $b_1$, and $a_0=a_1+b_1$.

Light irradiated on the fixed assembly 510 can be reflected by the fixed assembly 510 to the first optical proximity sensor 521. Light that is not irradiated on the fixed assembly 510 cannot return to the first optical proximity sensor 521.

Light that is detected by the first optical proximity sensor 521 and that is incident on the first optical proximity sensor 521 includes light reflected by the fixed assembly 510.

Based on the spacing distance d between the fixed assembly 510 and the first optical proximity sensor 521 and the blocking angle $a_1$ of the first optical proximity sensor 521, a blocking height $h_1=d \times \tan(a_0/2)+d \times \tan(a_1-a_0/2)$ of the fixed assembly 510 in the second direction may be obtained. In this case, it is assumed that a light intensity of the light that is reflected by the fixed assembly 510 and that is detected by the first optical proximity sensor 521 is a first light intensity value. The first light intensity value may be, for example, $I \times a_1/a_0$. Alternatively, the first light intensity value may be, for example, $I \times h_1/h_0$.

Because a part of the light emitted by the first optical proximity sensor 521 may be reflected back to the first optical proximity sensor 521 by the fixed assembly 510, compared with that when the movable assembly is at the start position, a light intensity detected by the first optical proximity sensor 521 is slightly reduced in a process in which the movable assembly 520 is extended outside the electronic device 500. In addition, the blocking height of the fixed assembly 510 in the second direction is accordingly reduced, which indicates that a movement distance of the movable assembly 520 in the second direction is $h_0-h_1$.

Then, the movable assembly 520 continues moving upward, and moves to a second movement position. As shown in a figure between the arrow 2 and an arrow 3 in FIG. 6, the second movement position may be, for example, a position at which the first optical proximity sensor 521 is about to be completely exposed outside the electronic device 500.

A part of the light emitted by the first optical proximity sensor 521 may be irradiated on the fixed assembly 510, and the other part of the light cannot be irradiated on the fixed assembly 510. For example, a total emission angle of the first optical proximity sensor 521 is $a_0$, a blocking angle of the first optical proximity sensor 521 may be $a_2$, an open angle of the first optical proximity sensor 521 is $b_2$, and $a_0=a_2+b_2$, where $a_2<a_1$, and $b_2>b_1$.

Light irradiated on the fixed assembly 510 can be reflected by the fixed assembly 510 to the first optical proximity sensor 521. Light that is not irradiated on the fixed assembly 510 cannot return to the first optical proximity sensor 521.

The first optical proximity sensor 521 can detect light that is incident on the first optical proximity sensor 521. The light that is incident on the first optical proximity sensor 521 includes light reflected by the fixed assembly 510. It can be learned that the light intensity of the light reflected back to the first optical proximity sensor 521 by the fixed assembly 510 continues decreasing.

Based on the spacing distance d between the fixed assembly 510 and the first optical proximity sensor 521 and the blocking angle $a_2$ of the first optical proximity sensor 521, a blocking height $h_2 = d \times \tan(a_0/2) - d \times \tan(a_0/2 - a_2)$ of the fixed assembly 510 in the second direction may be obtained. It can be learned that $h_2 < h_1$, that is, the blocking height continues decreasing. In this case, a movement distance of the movable assembly 520 in the second direction is $h_0 - h_2$. In a process in which the movable assembly 520 moves from the first movement position to the second movement position, a displacement of the movable assembly 520 in the second direction may be $h_1 - h_2$. In this case, a light intensity of the light that is reflected by the fixed assembly 510 and that is detected by the first optical proximity sensor 521 may be a second light intensity value. The second light intensity value may be, for example, $I \times a_2/a_0$. Alternatively, the second light intensity value may be, for example, $I \times h_2/h_0$. Obviously, the first light intensity value is different from the second light intensity value.

Because the first optical proximity sensor 521 is about to be completely exposed outside the electronic device 500, light incident on the first optical proximity sensor 521 may further include external ambient light.

Optionally, the movable assembly 520 may further include an ambient light sensor (not shown in FIG. 6). The ambient light sensor is configured to detect a light intensity of an ambient environment of the ambient light sensor. A position of the ambient light sensor may be flush with a position of the first optical proximity sensor 521 in the second direction.

That a position of the ambient light sensor is flush with a position of the first optical proximity sensor 521 in the second direction may mean that a spacing between the center of the ambient light sensor and the center of the first optical proximity sensor 521 in the second direction is less than a first target threshold. In other words, the light intensity detected by the ambient light sensor can reflect a light intensity of external ambient light that is incident on the first optical proximity sensor 521. Therefore, a part of the light intensity detected by the first optical proximity sensor 521 can be offset according to the light intensity detected by the ambient light sensor, to obtain the light intensity of the light reflected by the fixed assembly 510.

Then, the movable assembly 520 continues moving upward. A figure on the right side of the arrow 3 in FIG. 6 shows a case in which the fixed assembly 510 can hardly block the light emitted by the first optical proximity sensor 521.

The light emitted by the first optical proximity sensor 521 can hardly be reflected back to the first optical proximity sensor 521 by the fixed assembly 510. In other words, a light intensity of light reflected back to the first optical proximity sensor 521 by the fixed assembly 510 may be ignored. In this case, a total emission angle of the first optical proximity sensor 521 is $a_0$, an open angle of the first optical proximity sensor 521 may be considered as $a_0$, and a blocking angle of the first optical proximity sensor 521 may be approximately denoted as 0.

Based on the spacing distance d between the fixed assembly 510 and the first optical proximity sensor 521 and the blocking angle of the first optical proximity sensor 521, it may be learned that a blocking height of the fixed assembly 510 in the second direction may be approximately denoted as 0. In other words, the movable assembly 520 moves at least $h_0$ in the second direction.

In conclusion, when the movable assembly 520 moves upward, the light intensity of the light that is reflected by the fixed assembly 510 and that is detected by the first optical proximity sensor 521 can continuously decrease. In other words, the light intensity of the light reflected by the fixed assembly 510 can reflect a displacement of the first optical proximity sensor 521 in the second direction. It should be understood that in a process in which the movable assembly 520 moves only along a Y-axis direction shown in FIG. 6, a first light intensity may not change.

Optionally, when a lowest position of the electronic component on the movable assembly 520 in the second direction is flush with a highest position of the fixed assembly 510 in the second direction, the first light intensity is greater than 0 and less than a maximum value of the first light intensity, and the first light intensity is a light intensity of light that is reflected by the fixed assembly 510 and that is detected by the first optical proximity sensor 521.

It is assumed that when the first light intensity is greater than 0 and less than the maximum value of the first light intensity, the lowest position of the electronic component in the second direction is exposed, which indicates that the electronic component is completely exposed outside the electronic device 500. The movable assembly 520 continues moving upwards, and the first light intensity may still reflect a movement position of the movable assembly. Therefore, the electronic component can be completely exposed outside the electronic device 500 relatively accurately.

In other words, when the light emitted by the first optical proximity sensor 521 cannot be irradiated on the fixed assembly 510, the lowest position of the electronic component in the second direction is higher than the highest position of the fixed assembly 510 in the second direction.

It can be learned from the foregoing description that once the light emitted by the first optical proximity sensor 521 cannot be irradiated on the fixed assembly 510, the first optical proximity sensor 521 cannot detect the light reflected by the fixed assembly 510. It is assumed that the lowest position of the electronic component in the second direction is not exposed yet, which indicates that the electronic component is not completely exposed outside the electronic device 500. If the movable assembly 520 continues moving upwards, it becomes relatively difficult to accurately determine the movement position of the movable assembly 520.

Optionally, when the first light intensity is equal to the maximum value of the first light intensity, the lowest position of the electronic component in the second direction is lower than the highest position of the fixed assembly 510 in the second direction.

That is, when all (or almost all, or basically all) of the light emitted by the first optical proximity sensor 521 is irradiated on the fixed assembly 510, the lowest position of the electronic component in the second direction is lower than the highest position of the fixed assembly 510 in the second direction.

It can be learned from the foregoing description that, within a segment of displacement of the movable assembly 520, if all of the light emitted by the first optical proximity sensor 521 is always irradiated on the fixed assembly 510, light that is reflected by the fixed assembly 510 and that is detected by the first optical proximity sensor 521 almost does not change. It is assumed that the lowest position of the electronic component in the second direction is already exposed, it indicates that the movable assembly 520 may no longer move upward. If the movable assembly 520 continues moving upwards, the movable assembly 520 may generate an excessively large displacement, further resulting in problems that the movable assembly 520 is easily broken, damaged, or the like.

Figure 7:
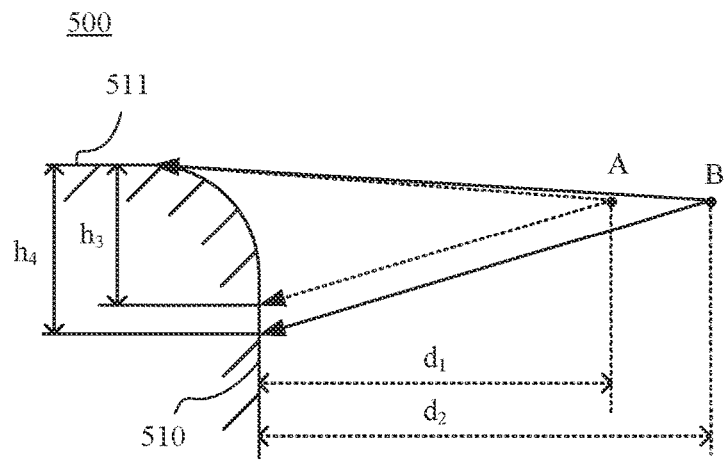
FIG. 7 is a schematic structural diagram in which a first optical proximity sensor is blocked by a fixed assembly at different spacings according to an embodiment of this application.

In the embodiment shown in FIG. 6, the spacing distance d between the first optical proximity sensor 521 and the fixed assembly 510 in the first direction may be approximately considered as a fixed value. It is now assumed that the spacing distance d is not a fixed value, to be specific, in a process in which the electronic component on the movable assembly 520 is exposed outside the electronic device 500, the spacing distance d between the first optical proximity sensor 521 and the fixed assembly 510 in the first direction can continuously decrease or increase. As shown in FIG. 7, A and B respectively represent positions of the first optical proximity sensor 521, and A and B are flush with each other in the second direction. A spacing distance between the position A and the fixed assembly 510 in the first direction is $d_1$, a spacing distance between the position B and the fixed assembly 510 in the first direction is $d_2$, and $d_2 > d_1$. A larger spacing distance between the first optical proximity sensor 521 and the fixed assembly 510 in the first direction indicates a higher degree to which light reflected by the fixed assembly 510 is weakened before the light reaches the first optical proximity sensor 521. In addition, it can be learned from FIG. 7 that the fixed assembly 510 may block light emitted by the first optical proximity sensor 521 at the positions A and B. A blocking height corresponding to the position A may be represented as $h_3$, a blocking height corresponding to the position B may be represented as $h_4$, and $h_3 < h_4$. A higher blocking height indicates a larger light intensity of the light reflected by the fixed assembly 510. Therefore, that the target plane 530 is disposed in parallel relative to the fixed assembly 510, described in this application, may indicate that an inclination angle of the target plane 530 relative to the fixed assembly 510 is less than a second target threshold. That is, the target plane 530 needs to be disposed at least substantially (approximately) in parallel relative to the fixed assembly 510.

Embodiments of this application provide a control method for the movable assembly 520, to control, based on a movement position of the movable assembly, the movable assembly 520 to move to a target position.

701: Control the movable assembly 520 to move on a target plane 530 that is disposed in parallel relative to a fixed assembly 510, where there is a preset spacing distance between the movable assembly and the fixed assembly in a first direction, the target plane is disposed perpendicularly relative to the first direction, a movement displacement of the movable assembly includes a movement displacement in a second direction, the second direction is disposed perpendicularly relative to the first direction, the second direction is disposed in parallel relative to the target plane, the movable assembly 520 includes a first optical proximity sensor 521, the first optical proximity sensor 521 is configured to emit light and detect a light intensity of light incident on the first optical proximity sensor 521, at least a part of the light emitted by the first optical proximity sensor 521 is irradiated on the fixed assembly 510, and the light incident on the first optical proximity sensor 521 includes light that is from the first optical proximity sensor 521 and that is reflected by the fixed assembly 510.

The fixed assembly 510 may include one or more components that are relatively stationary in vision of a user. The fixed assembly 510 includes, for example, a target side surface surrounding an electronic device 500, and the target side surface is relatively fixed in vision of the user (for example, the side surface surrounding the display in FIG. 2 to FIG. 4).

The movable assembly 520 may include one or more components that are relatively movable in vision of the user. The movable assembly 520 may further include, for example, a drive unit and an electronic component. The drive unit may drive the movable assembly 520 to move relative to the fixed assembly 510. The drive unit may be considered as a power source for movement of the movable assembly 520. By moving the movable assembly 520, the electronic component originally retracted inside the electronic device 500 may be exposed outside the electronic device 500, or the electronic component exposed outside the electronic device 500 may be retracted inside the electronic device 500. The drive unit may include, for example, a motor. The motor may be driven to rotate by powering on the motor, to drive the movable assembly 520 to move.

Because the movable assembly 520 moves on the target plane 530 disposed in parallel relative to the fixed assembly 510, a spacing distance between the first optical proximity sensor 521 and the fixed assembly 510 in the first direction may be considered as a fixed value. The first direction may be a direction disposed perpendicularly relative to the target plane 530. A movement manner of the movable assembly 520 on the target plane 530 may be a linear motion, a circular motion, or the like.

702: Control the movable assembly 520 to stop moving when a first light intensity reaches a first preset light intensity value, so that the movable assembly stays at a first target position, where the first light intensity is a light intensity of light that is detected by the first optical proximity sensor 521 and that is reflected by the fixed assembly 510.

Figure 8:
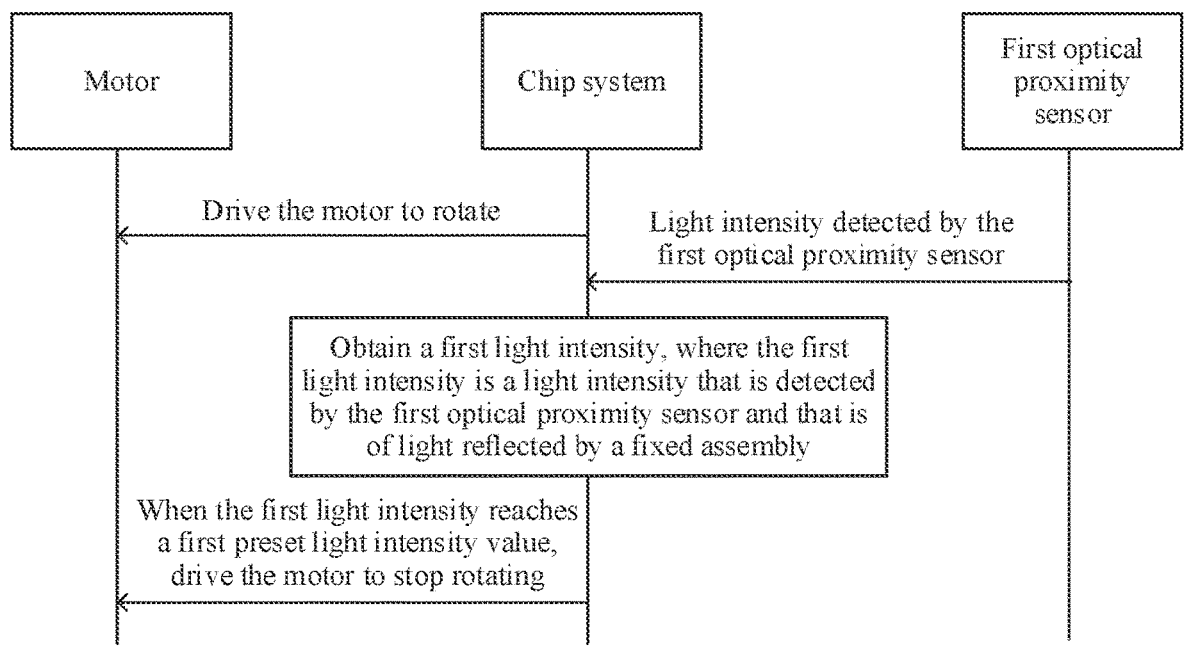
FIG. 8 is a schematic flowchart of a control method for a movable assembly according to an embodiment of this application.

FIG. 8 is a schematic flowchart of controlling the movable assembly to move and stay at the first target position.

The first light intensity may alternatively be a light intensity of the light that is from the first optical proximity sensor 521 and that is reflected by the fixed assembly 510. As described in the embodiment shown in FIG. 6, the displacement of the movable assembly 520 in the second direction is related to the light intensity of the light reflected by the fixed assembly 510. A current position of the movable assembly 520 in the second direction may be learned by obtaining the first light intensity.

As the movable assembly 520 moves, the first light intensity may continuously change. Therefore, a correspondence between the position of the movable assembly 520 in the second direction and the first light intensity may be established. Further, the current position of the movable assembly 520 in the second direction may be determined based on the first light intensity.

For example, when the movable assembly 520 moves to a position 1 in the second direction, the first light intensity is a light intensity 1. The movable assembly 520 continues moving upwards (for example, the electronic component continues moving in a direction in which the electronic component is exposed outside the electronic device 500). When the movable assembly 520 moves to a position 2 in the second direction, the first light intensity is a light intensity 2. The light intensity 2 may be less than the light intensity 1. When the first light intensity is greater than the light intensity 1, compared with the position 1, the position of the movable assembly 520 in the second direction may be relatively closer to the inner side of the electronic device.

When the first light intensity is greater than the light intensity 2 and less than the light intensity 1, the position of the movable assembly 520 in the second direction may be between the position 1 and the position 2. When the first light intensity is less than the light intensity 2, compared with the position 2, the position of the movable assembly 520 in the second direction may be relatively closer to the outer side of the electronic device.

Optionally, the movable assembly 520 further includes an ambient light sensor The ambient light sensor is configured to detect a light intensity of an ambient environment of the ambient light sensor. A position of the ambient light sensor is flush with a position of the first optical proximity sensor 521 in the second direction. Before the controlling the movable assembly 520 to stop moving, the control method further includes: determining the first light intensity based on a light intensity detected by the first optical proximity sensor 521 and a light intensity detected by the ambient light sensor.

As the movable assembly 520 moves, the light incident on the first optical proximity sensor 521 may further include external ambient light. Therefore, a part of the light intensity detected by the first optical proximity sensor 521 can be offset according to the light intensity detected by the ambient light sensor, to obtain the first light intensity.

When the movable assembly 520 stays at the first target position, the first target position may correspond to a current position of a highest point of the movable assembly 520 in the second direction. It is assumed that the movable assembly 520 is ready to move to the first target position. A light intensity corresponding to the first target position is the first preset light intensity value. When the first light intensity reaches the first preset light intensity value, it may indicate that the movable assembly 520 has moved to the first target position. The movable assembly 520 is controlled to stop, so that the movable assembly 520 can stay at the first target position.

As described above, the first light intensity may be relatively high when the electronic component on the movable assembly 520 is retracted inside the electronic device 500, and the first light intensity may be relatively low when the electronic component on the movable assembly 520 is exposed outside the electronic device 500. Therefore, when the first light intensity is greater than the first preset light intensity value, it indicates that the movable assembly 520 further needs to continue moving upward. Once the first light intensity reaches the first preset light intensity value, it indicates that the movable assembly 520 has moved to the first target position. In this case, the movable assembly 520 may be controlled to stop.

Optionally, when the first light intensity is less than the first preset light intensity value, it indicates that the movable assembly 520 moves upward a further distance based on the first target position. In a possible manner, the movable assembly 520 is controlled to return to the first target position.

Optionally, before the controlling the movable assembly 520 to stop moving, the control method further includes: determining, based on the first light intensity, a movement displacement of the movable assembly 520 relative to the fixed assembly 510 in the second direction. The controlling the movable assembly 520 to stop moving when the first light intensity reaches a first preset light intensity value includes: controlling the movable assembly 520 to stop moving when the movement displacement reaches a target displacement threshold, where the first light intensity reaches the first preset light intensity value when the first light intensity reaches the first preset light intensity value.

That is, the target displacement threshold corresponds to the first preset light intensity value. That is, when the movement displacement of the movable assembly 520 reaches the target displacement threshold, the first light intensity may reach the first preset light intensity value.

It has been described above. The blocking angle of the first optical proximity sensor 521 may be determined based on a light intensity of the light reflected by the fixed assembly 510. Based on the spacing distance between the first optical proximity sensor 521 and the fixed assembly 510 in the first direction, the blocking angle of the first optical proximity sensor 521, a total emission angle of the first optical proximity sensor 521, and the like, a displacement of the movable assembly 520 relative to the fixed assembly 510 in the second direction may be determined. When the movement displacement reaches a target displacement threshold, the first light intensity may reach the first preset light intensity value. In this case, the movable assembly 520 is controlled to stop moving, so that the movable assembly can stay at the first target position.

Figure 9:
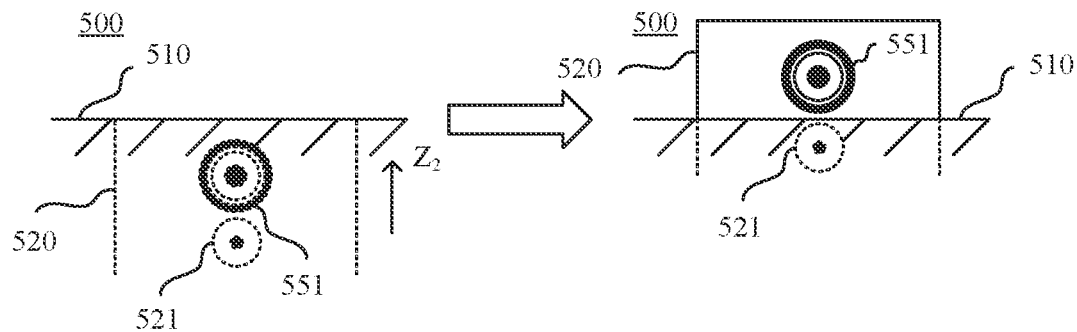
FIG. 9 is a schematic diagram of an application scenario of a control method for a movable assembly according to an embodiment of this application.
Figure 10:
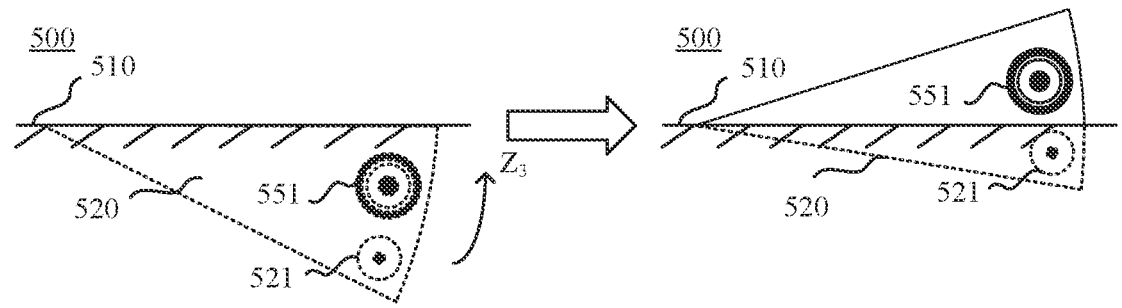
FIG. 10 is a schematic diagram of an application scenario of a control method for a movable assembly according to an embodiment of this application.
Figure 11:
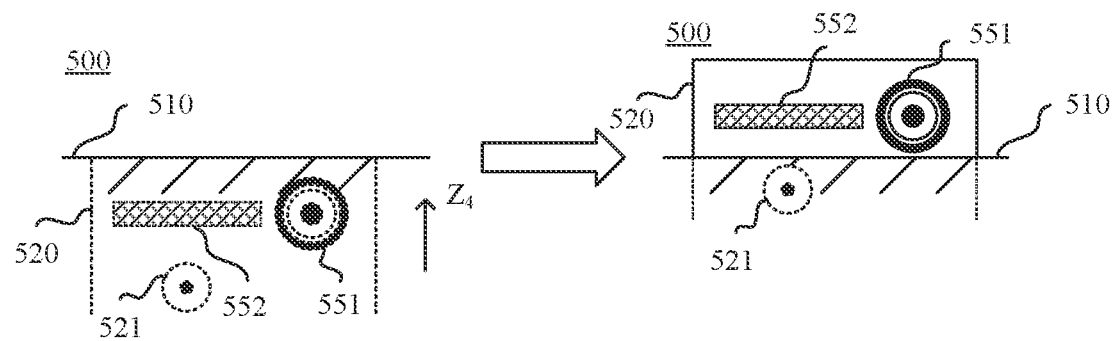
FIG. 11 is a schematic diagram of an application scenario of a control method for a movable assembly according to an embodiment of this application.

With reference to FIG. 9 to FIG. 11, the following describes an application scenario of a control method for a movable assembly 520 according to an embodiment of this application. An electronic device 500 may include a fixed assembly 510 and the movable assembly 520.

In an example, a left figure in FIG. 9 shows a schematic diagram of a structure of the movable assembly 520 before the movable assembly 520 starts to move. The movable assembly 520 may include a first optical proximity sensor 521 and a camera 551. A dashed line in FIG. 9 represents an area that is of the movable assembly 520 and that is not exposed outside the electronic device 500, and a solid line in FIG. 9 represents an area that is of the movable assembly 520 and that is exposed outside the electronic device 500. A direction $Z_2$ in FIG. 9 may represent a movement direction of the movable assembly 520. In other words, the movable assembly 520 may move in the second direction. The movable assembly 520 may reach a first target position after moving. In this case, a first light intensity reaches a first preset light intensity value. Aright figure in FIG. 9 shows a schematic diagram of a structure of the movable assembly 520 that stops moving at the first target position. It can be learned that the camera 551 originally retracted inside in the electronic device 500 is exposed outside the electronic device 500.

In an example, a left figure in FIG. 10 shows a schematic diagram of a structure of the movable assembly 520 before the movable assembly 520 starts to move. The movable assembly 520 may include a first optical proximity sensor 521 and a camera 551. A dashed line in FIG. 10 represents an area that is of the movable assembly 520 and that is not exposed outside the electronic device 500, and a solid line in FIG. 10 represents an area that is of the movable assembly 520 and that is exposed outside the electronic device 500. A direction $Z_3$ in FIG. 10 may represent a circular motion direction of the movable assembly 520. In other words, the movable assembly 520 may rotate around a rotating shaft. The movable assembly 520 may reach a first target position after r moving. In this case, a first light intensity reaches a first preset light intensity value. A right figure in FIG. 10 shows a schematic diagram of a structure of the movable assembly 520 that stops moving at the first target position. It can be learned that the camera 551 originally retracted inside in the electronic device 500 is exposed outside the electronic device 500.

In an example, a left figure in FIG. 11 shows a schematic diagram of a structure of the movable assembly 520 before the movable assembly 520 starts to move. The movable assembly 520 may include a first optical proximity sensor 521, a camera 551, and a speaker 552. A dashed line in FIG. 11 represents an area that is of the movable assembly 520 and that is not exposed outside the electronic device 500, and a solid line in FIG. 11 represents an area that is of the movable assembly 520 and that is exposed outside the electronic device 500. A direction $Z_4$ in FIG. 11 may represent a movement direction of the movable assembly 520. In other words, the movable assembly 520 may move in the second direction. The movable assembly 520 may reach a first target position after moving. In this case, a first light intensity reaches a first preset light intensity value. A right figure in FIG. 11 shows a schematic diagram of a structure of the movable assembly 520 that stops moving at the first target position. It can be learned that the camera 551 and the speaker 552 originally retracted inside in the electronic device 500 are exposed outside the electronic device 500.

It can be learned from the examples shown in FIG. 9 to FIG. 11 that, optionally, when an electronic component on the movable assembly 520 is exposed outside the electronic device 500, the first optical proximity sensor may not be exposed outside the electronic device 500. In another example, when the electronic component on the movable assembly 520 is exposed outside the electronic device 500, the first optical proximity sensor may be partially or completely exposed outside the electronic device 500.

Optionally, before the controlling the movable assembly 520 to stop moving, the control method further includes: obtaining moving time of the movable assembly 520; and when the moving time of the movable assembly 520 exceeds a preset time threshold, determining that the movable assembly 520 moves abnormally.

In other words, the first light intensity has not reached the first preset light intensity value, which means that the movable assembly 520 has not moved to the first target position. In this case, the movable assembly 520 has moved for a relatively long time. This may indicate that movement of the movable assembly 520 is blocked. Therefore, the electronic device 500 may check, based on the first light intensity and the moving time of the movable assembly 520, whether a current moving status of the movable assembly 520 is abnormal. This can be considered as a closed-loop feedback function of the movable assembly 520.

Optionally, the control method further includes: displaying target indication information. The target indication information indicates that the movable assembly 520 moves abnormally.

In other words, the electronic device 500 may display the target indication information, to notify the user that the movable assembly 520 moves abnormally.

Figure 12:
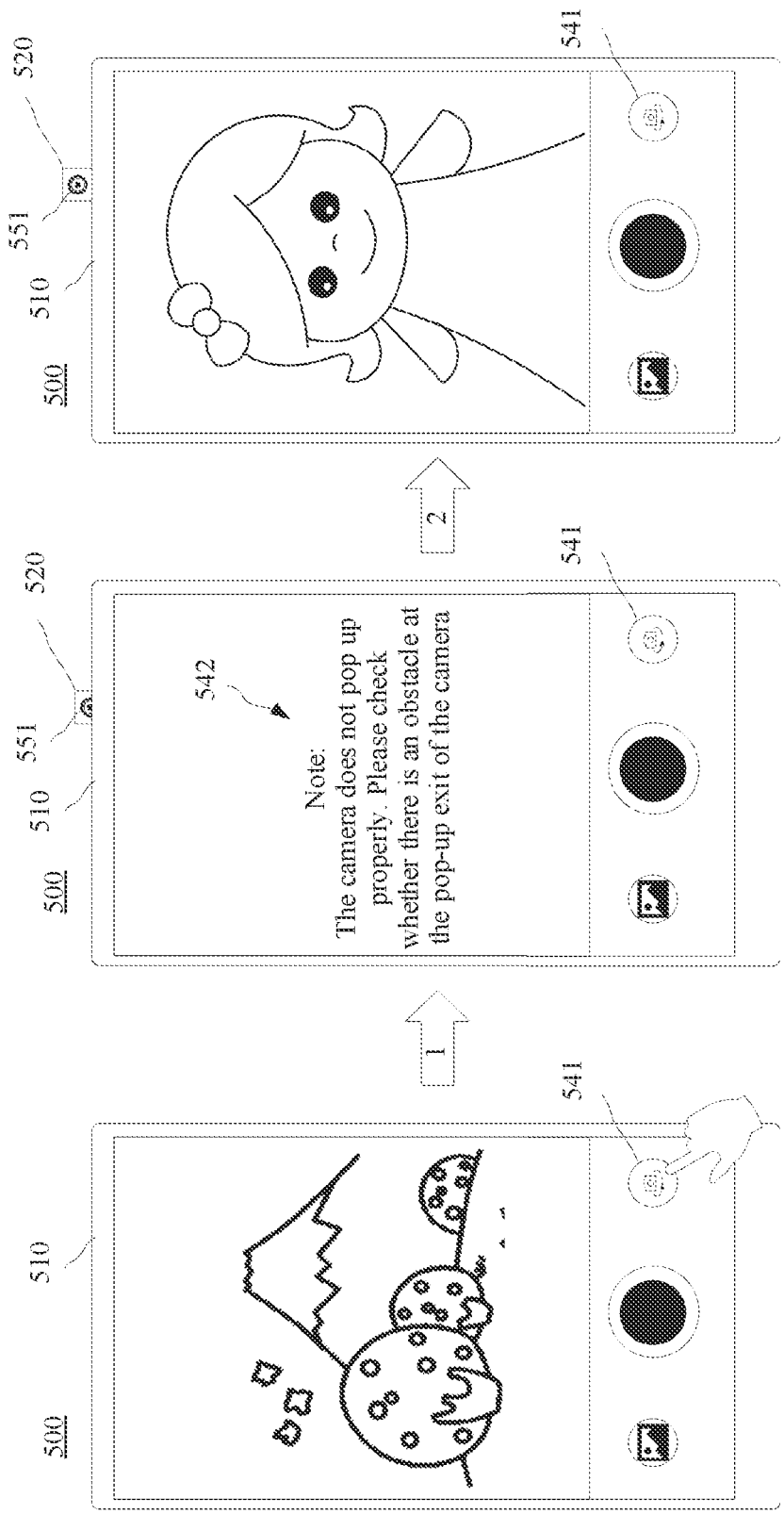
FIG. 12 is a schematic diagram of an application scenario of a control method for a movable assembly according to an embodiment of this application.

With reference to FIG. 12, the following describes an application scenario of a control method for a movable assembly 520 according to an embodiment of this application. An electronic device 500 may be, for example, a mobile phone. The electronic device 500 may include a fixed assembly 510 and the movable assembly 520. The fixed assembly 510 may be, for example, a side surface surrounding a display. The movable assembly 520 may include a first optical proximity sensor (not shown in FIG. 12) and a front-facing camera 551.

First, the movable assembly 520 may be at a start position before movement. A figure on the left side of an arrow 1 in FIG. 12 shows a schematic diagram of a user interface of the electronic device 500. It can be learned from the figure that in this case, no electronic component is exposed outside the electronic device 500. A user may use a rear-facing camera of the electronic device 500 to photograph an ambient environment of the electronic device 500.

Then, the user may tap an icon 541 having a camera switching function on the user interface. In a normal case, after the icon 541 is tapped, the front-facing camera 551 may be switched to for use, and the movable assembly 520 is driven to move, to expose the front-facing camera 551 outside the electronic device 500.

However, when the movable assembly 520 is blocked by an improper external force, the electronic device 500 may detect that an exception occurs in movement of the movable assembly 520. As shown in a figure located between the arrow 1 and an arrow 2 in FIG. 6, the electronic device 500 may display target indication information 542, to prompt the user to check whether there is an abnormal obstacle blocking the movable assembly 520.

Then, after the abnormal movement problem of the movable assembly 520 is eliminated, the movable assembly 520 may continue to move normally until the movable assembly 520 moves to a first target position. The electronic device 500 may determine, based on a first light intensity, whether the movable assembly 520 moves to the first target position. After the movable assembly 520 moves to the first target position, the electronic device 500 may complete switching from the rear-facing camera to the front-facing camera 551. For example, the user may use the front-facing camera 551 to perform an operation such as selfie.

Optionally, before the controlling the movable assembly 520 to move on a target plane 530 that is disposed in parallel relative to the fixed assembly 510, the control method further includes: detecting a first operation. The controlling the movable assembly 520 to move on a target plane 530 that is disposed in parallel relative to the fixed assembly 510 includes: controlling, according to the first operation, the movable assembly 520 to move on the target plane 530.

In other words, before the electronic device 500 detects the first operation, the movable assembly 520 may be located at a start position before movement. After the electronic device 500 detects the first operation, the electronic device 500 may control, in response to the first operation, the movable assembly 520 to move on the target plane 530, so that the electronic component on the movable assembly 520 is exposed outside the electronic device 500.

Figure 13:
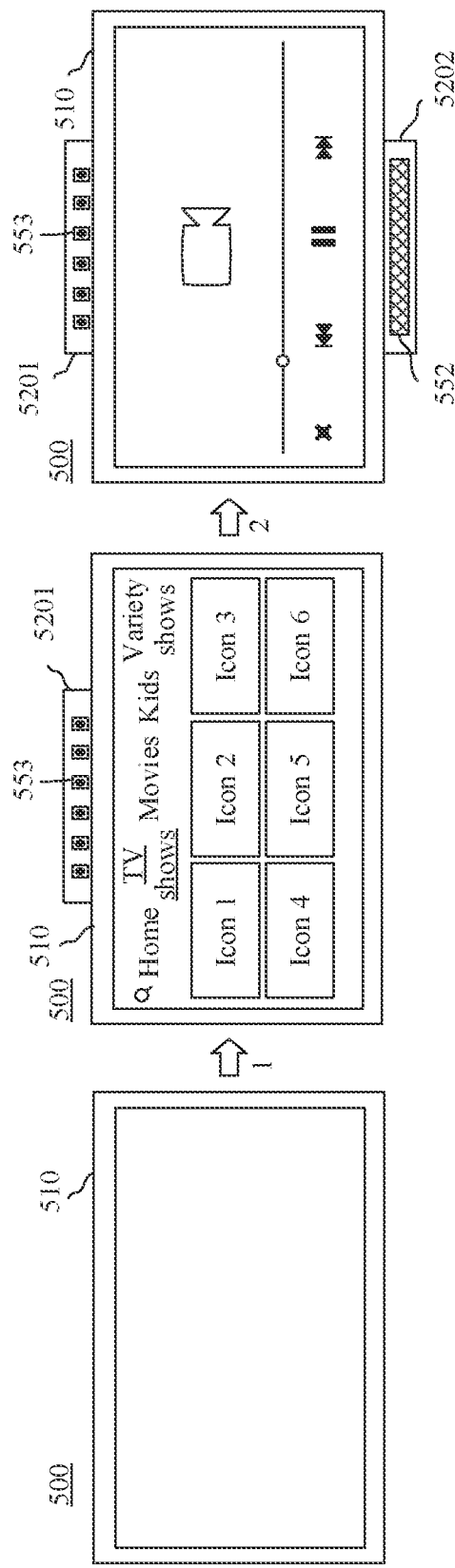
FIG. 13 is a schematic diagram of an application scenario of a control method for a movable assembly according to an embodiment of this application.

With reference to FIG. 13, the following describes an application scenario of a control method for a movable assembly 520 according to an embodiment of this application. An electronic device 500 may be, for example, a television (or a smart screen). The electronic device 500 may include a fixed assembly 510, a movable assembly 5201, and a movable assembly 5202. The fixed assembly 510 may be, for example, a side surface surrounding a display. The movable assembly 5201 may include a first optical proximity sensor (not shown in FIG. 13) and one or more microphones 553. The movable assembly 5202 may include a first optical proximity sensor (not shown in FIG. 13) and a speaker 552.

First, when the electronic device 500 is not powered on, the movable assembly 520 may be at a start position before movement. A figure on the left side of an arrow 1 in FIG. 13 shows a schematic diagram of a structure of the electronic device 500. It can be learned from the figure that in this case, no electronic component is exposed outside the electronic device 500.

Then, a user may turn on the electronic device 500. The electronic device 500 may have a voice remote control function. Therefore, after the electronic device 500 is powered on, the electronic device 500 may drive the movable assembly 5201 to move, so that the microphone 553 carried by the movable assembly 5201 is exposed outside the electronic device 500. As shown in a figure between the arrow 1 and an arrow 2 in FIG. 13, the user may observe a menu page displayed by the electronic device 500, and speak a voice instruction. The microphone 553 on the movable assembly 5201 may record the voice instruction of the user, so that the electronic device 500 performs an operation related to the voice instruction. Optionally, to monitor the voice instruction of the user in real time, the microphone 553 carried by the movable assembly 5201 may be always exposed outside the electronic device 500.

The user may select a to-be-played television series on the menu page, and instruct, in a form of a voice instruction, the electronic device 500 to play the television series. As shown in a figure on the right side of the arrow 2 in FIG. 13, the electronic device 500 may drive the movable assembly 5202 to move according to the voice instruction of the user, so that the speaker 552 carried by the movable assembly 5202 is exposed outside the electronic device 500, to play audio data of the television series.

Optionally, after the user instructs the electronic device 500 to power off, the electronic device 500 may retract the exposed movable assembly 5201 and the exposed movable assembly 5202 inside the electronic device 500. Therefore, when the electronic device 500 is not running, the electronic device 500 may have relatively few exposed electronic components.

As shown in FIG. 13, from the perspective of user vision, the microphone 553 moves upward to be exposed outside the electronic device 500, and the speaker 552 moves downward to be exposed outside the electronic device 500. According to the definitions of "up" (or "high") and "down" (or "low") above, movement from the inside of the electronic device 500 to the outside of the electronic device 500 is collectively referred to as "bottom-up" ("low-to-high") movement. In other words, unless otherwise specified, in this application, a movement direction of the movable assembly may be irrelevant to intuitive vision of the user. For example, in the example shown in FIG. 13, both the microphone 553 and the speaker 552 perform the "bottom-up" movement relative to the fixed assembly 510. When the displacement of the movable assembly 520 is relatively large, the microphone 553 and the speaker 552 may be "higher" relative to the fixed assembly 510. When the displacement of the movable assembly 520 is relatively small, the microphone 553 and the speaker 552 may be "lower" relative to the fixed assembly 510.

Optionally, the movable assembly 520 further includes a first electronic component and a second electronic component, a central position of the first optical proximity sensor 521 is a first central position, a central position of the first electronic component is a second central position, a central position of the second electronic component is a third central position, and a position of the first central position in the second direction is between the second central position and the third central position.

In other words, in a process in which the movable assembly 520 moves upwards, time at which the first central position is exposed outside the electronic device 500 may be later than time at which the second central position is exposed outside the electronic device 500, and time at which the third central position is exposed outside the electronic device 500 may be later than time at which the first central position is exposed outside the electronic device 500. In a possible case, at a moment at which the first electronic component is completely exposed outside the electronic device 500, the second electronic component has not started to be exposed, and the first optical proximity sensor 521 is partially exposed outside the electronic device 500. Then, the movable assembly 520 may stop moving, or the movable assembly 520 may continue moving upward until the second electronic component is completely exposed outside the electronic device 500.

Optionally, the controlling, based on the first operation, the movable assembly to move on the target plane includes: in response to the first operation, determining that the movable assembly is ready to stay at the first target position. After the movable assembly stays at the first target position, the control method further includes: in response to a second operation, determining that the movable assembly is ready to stay at a second target position; controlling the movable assembly 520 to move on the target plane 530 disposed in parallel relative to the fixed assembly 510; and when the first light intensity reaches a second preset light intensity value, controlling the movable assembly 520 to stop moving, so that the movable assembly stays at the second target position.

Optionally, the first light intensity is used to control the movable assembly to move to the first target position and the second target position, the first target position and the second target position are staggered in the second direction, the first light intensity reaches a first preset light intensity value when the movable assembly stays at the first target position, the first light intensity reaches a second preset light intensity value when the movable assembly stays at the second target position, and the first preset light intensity value is different from the second preset light intensity value.

When the movable assembly 520 stays at the second target position, the second target position may correspond to a current position of a highest point of the movable assembly 520 in the second direction.

With reference to the foregoing description, in a stroke of the movable assembly 520, the first light intensity may continuously change. In other words, a plurality of different positions of the movable assembly 520 in the second direction may be in a one-to-one correspondence with a plurality of different values of the first light intensity. Therefore, one or more target positions may be determined in the stroke, so that the electronic device 500 can control, based on the first light intensity, the movable assembly 520 to stay at the plurality of target positions.

Figure 14:
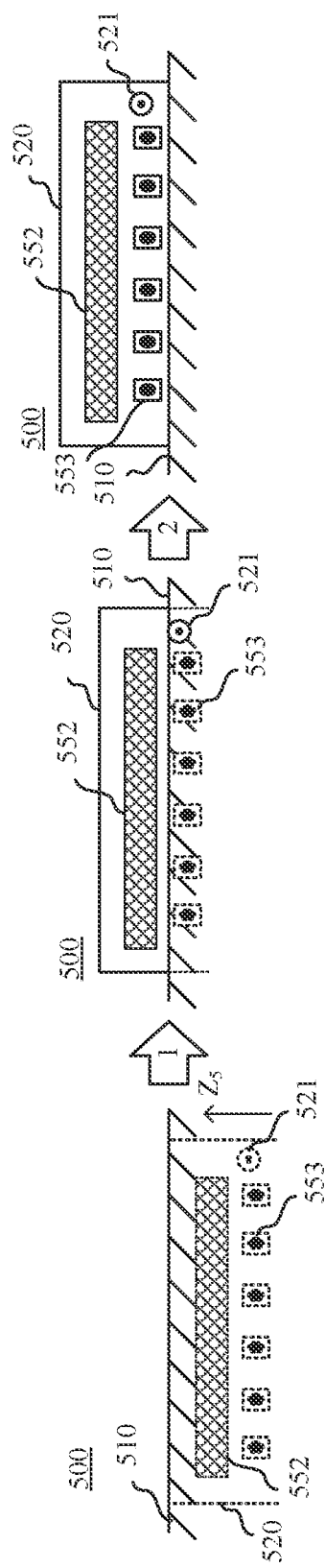
FIG. 14 is a schematic diagram of an application scenario of a control method for a movable assembly according to an embodiment of this application.
Figure 15:
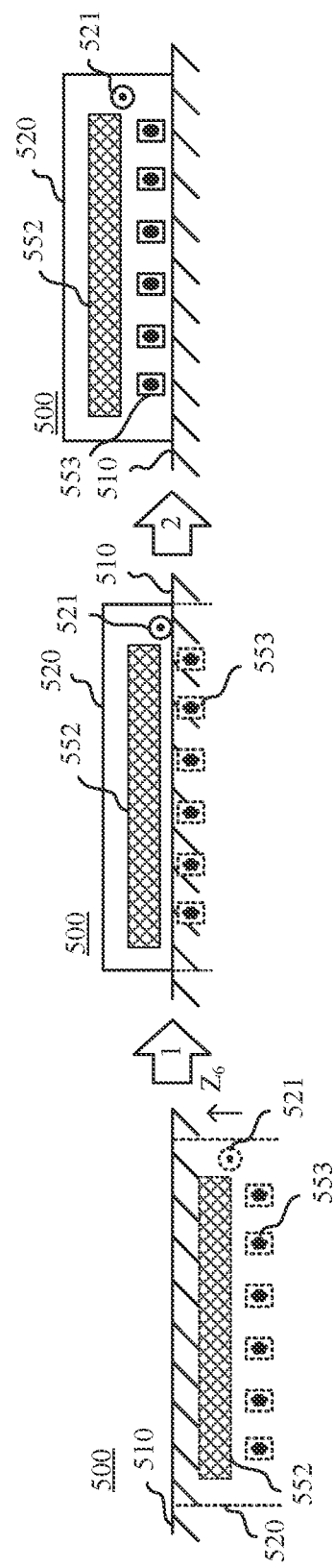
FIG. 15 is a schematic diagram of an application scenario of a control method for a movable assembly according to an embodiment of this application.
Figure 16:
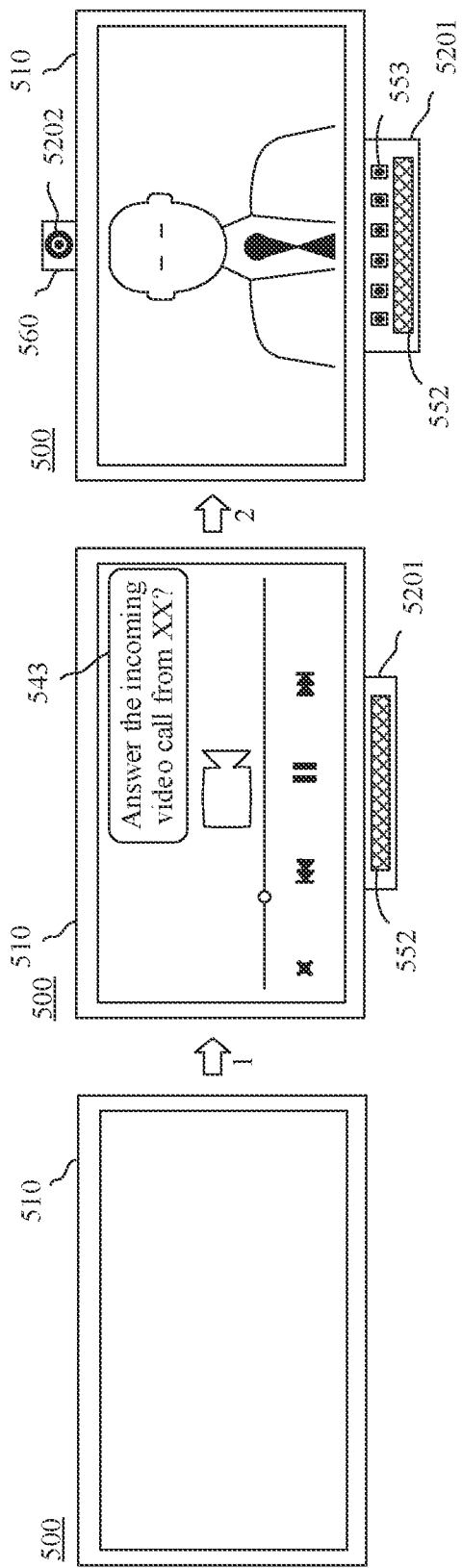
FIG. 16 is a schematic diagram of an application scenario of a control method for a movable assembly according to an embodiment of this application.

With reference to FIG. 14 to FIG. 16, the following describes an application scenario of a control method for a movable assembly 520 according to an embodiment of this application. An electronic device 500 may include a fixed assembly 510 and the movable assembly 520.

In an example, a figure on the left side of an arrow 1 in FIG. 14 shows a schematic diagram of a structure of the movable assembly 520 before the movable assembly 520 starts to move. The movable assembly 520 may include a first optical proximity sensor 521, a speaker 552, and one or more microphones 553. In a second direction, a position of the first optical proximity sensor 521 is between the speaker 552 and the microphone 553. A dashed line in FIG. 14 represents an area that is of the movable assembly 520 and that is not exposed outside the electronic device 500, and a solid line in FIG. 14 represents an area that is of the movable assembly 520 and that is exposed outside the electronic device 500. A direction $Z_5$ in FIG. 14 may represent a movement direction of the movable assembly 520. In other words, the movable assembly 520 may move in the second direction. The movable assembly 520 may reach a first target position after moving. In this case, a first light intensity reaches a first preset light intensity value. A figure between the arrow 1 and an arrow 2 in FIG. 14 shows a schematic diagram of a structure of the movable assembly 520 that stops moving at the first target position. It can be learned that the speaker 552 originally retracted inside the electronic device 500 may be exposed outside the electronic device 500, and the microphone 553 on the movable assembly 520 is still retracted inside the electronic device 500. Optionally, the first optical proximity sensor 521 is still retracted inside the electronic device 500. For example, the first optical proximity sensor 521 may be about to be exposed outside the electronic device 500. The movable assembly 520 may continue to move, and may reach a second target position. In this case, the first light intensity reaches a second preset light intensity value. A figure on the right side of the arrow 2 in FIG. 14 shows a schematic diagram of a structure of the movable assembly 520 that stops moving at the second target position. It can be learned that the speaker 552, the microphone 553, and the first optical proximity sensor 521 that originally retracted inside the electronic device 500 are all exposed outside the electronic device 500.

In an example, a figure on the left side of an arrow 1 in FIG. 15 shows a schematic diagram of a structure of the movable assembly 520 before the movable assembly 520 starts to move. The movable assembly 520 may include a first optical proximity sensor 521, a speaker 552, and one or more microphones 553. In a second direction, a position of the first optical proximity sensor 521 is between the speaker 552 and the microphone 553. A dashed line in FIG. 15 represents an area that is of the movable assembly 520 and that is not exposed outside the electronic device 500, and a solid line in FIG. 15 represents an area that is of the movable assembly 520 and that is exposed outside the electronic device 500. A direction $Z_6$ in FIG. 15 may represent a movement direction of the movable assembly 520. In other words, the movable assembly 520 may move in the second direction. The movable assembly 520 may reach a first target position after moving. In this case, a first light intensity reaches a first preset light intensity value. A figure between an arrow 1 and an arrow 2 in FIG. 15 shows a schematic diagram of a structure of the movable assembly 520 that stops moving at the first target position. It can be learned that the speaker 552 originally retracted inside the electronic device 500 may be exposed outside the electronic device 500, and the microphone 553 on the movable assembly 520 is still retracted inside the electronic device 500. Optionally, the first optical proximity sensor 521 is just completely exposed outside the electronic device 500. The movable assembly 520 may continue to move, and may reach a second target position. In this case, the first light intensity reaches a second preset light intensity value. A figure on the right side of the arrow 2 in FIG. 15 shows a schematic diagram of a structure of the movable assembly 520 that stops moving at the second target position. It can be learned that the speaker 552, the microphone 553, and the first optical proximity sensor 521 that originally retracted inside the electronic device 500 are all exposed outside the electronic device 500.

With reference to FIG. 16, the following describes an application scenario of a control method for a movable assembly 520 according to an embodiment of this application. The electronic device 500 may be, for example, a television (or a smart screen). The electronic device 500 may include a fixed assembly 510, a movable assembly 5201, and a movable assembly 5202. The fixed assembly 510 may be, for example, a side surface surrounding a display. The movable assembly 5201 may include a first optical proximity sensor (not shown in FIG. 16), a speaker 552, and one or more microphones 553. The movable assembly 5202 may include a first optical proximity sensor (not shown in FIG. 16) and a camera 551.

First, when the electronic device 500 is not powered on, the movable assembly 520 may be at a start position before movement. A figure on the left side of an arrow 1 in FIG. 16 shows a schematic diagram of a structure of the electronic device 500. It can be learned from the figure that in this case, no electronic component is exposed outside the electronic device 500.

Then, the user may turn on the electronic device 500, and play a video. As shown in a figure between the arrow 1 and an arrow 2 in FIG. 16, the electronic device 500 may drive the movable assembly 5201 to move, so that the speaker 552 carried by the movable assembly 5201 is exposed outside the electronic device 500, to play audio data corresponding to the video.

Then, the electronic device 500 receives a video chat request. The electronic device 500 may display prompt information 543, to ask the user whether to answer the video chat. The user can choose to answer the video chat. The electronic device 500 may drive the movable assembly 5201 to continue moving, so that the microphone 553 carried by the movable assembly 5201 is exposed outside the electronic device 500. In addition, the electronic device 500 may drive the movable assembly 5202 to move, so that the camera 551 carried by the movable assembly 5202 is exposed outside the electronic device 500. As shown in a figure on the right side of the arrow 2 in FIG. 16, the camera 551 on the movable assembly 5202 may shoot a scene in front of the electronic device 500, for example, may shoot a portrait in front of the electronic device 500. The microphone 553 on the movable assembly 5201 may record a voice of the user. The electronic device 500 may implement a video chat function based on video data collected by the camera 551 and audio data collected by the microphone 553.

Optionally, the movable assembly 520 further includes a second optical proximity sensor 522. A position of the second optical proximity sensor 522 in the second direction is different from a position of the first optical proximity sensor 521 in the second direction. The second optical proximity sensor emits light facing the fixed assembly and detects a light intensity of light incident on the second optical proximity sensor, the light incident on the second optical proximity sensor includes light that is from the second optical proximity sensor and that is reflected by the fixed assembly, a light intensity of the light that is reflected by the fixed assembly and that is detected by the second optical proximity sensor is a second light intensity, the second light intensity is used to control the movable assembly to move to a second target position, and the first target position and the second target position are staggered in the second direction.

Optionally, before the controlling the movable assembly 520 to move on a target plane 530 that is disposed in parallel relative to a fixed assembly 510, the control method further includes: in response to a first operation, determining that the movable assembly is ready to stay at the first target position. After the movable assembly stays at the first target position, the control method further includes: in response to a third operation, determining that the movable assembly is ready to stay at a third target position; controlling the movable assembly 520 to move on the target plane 530 disposed in parallel relative to the fixed assembly 510, where the movable assembly 520 further includes a second optical proximity sensor 522, a position of the second optical proximity sensor 522 in the second direction is different from a position of the first optical proximity sensor 521 in the second direction, the second optical proximity sensor 522 is configured to emit light and detect a light intensity of light incident on the second optical proximity sensor 522, at least a part of light emitted by the second optical proximity sensor 522 is irradiated on the fixed assembly 510, and the light incident on the second optical proximity sensor 522 includes light that is from the second optical proximity sensor 522 and is reflected by the fixed assembly 510; and when a second light intensity reaches a third preset light intensity value, controlling the movable assembly 520 to stop moving, so that the movable assembly stays at the third target position, where the second light intensity is a light intensity of light that is detected by the second optical proximity sensor 522 and that is reflected by the fixed assembly 510.

The second light intensity may also be a light intensity of light that is from the second optical proximity sensor 522 and that is reflected by the fixed assembly 510. When the movable assembly 520 stays at the third target position, the third target position may correspond to a current position of a highest point of the movable assembly 520 in the second direction.

As described above, if the light intensity detected by the optical proximity sensor basically does not change within a stroke of the movable assembly 520, the electronic device 500 cannot determine a current position of the movable assembly 520. For clear description, a stroke corresponding to a changed light intensity that can be detected by the first optical proximity sensor 521 is defined below as an effective control stroke of the first optical proximity sensor 521. If a moving stroke of the movable assembly 520 is far greater than an effective control stroke of the first optical proximity sensor 521, a plurality of optical proximity sensors may be disposed, so that the electronic device 500 can determine the current position of the movable assembly 520 within a relatively long moving stroke.

Figure 17:
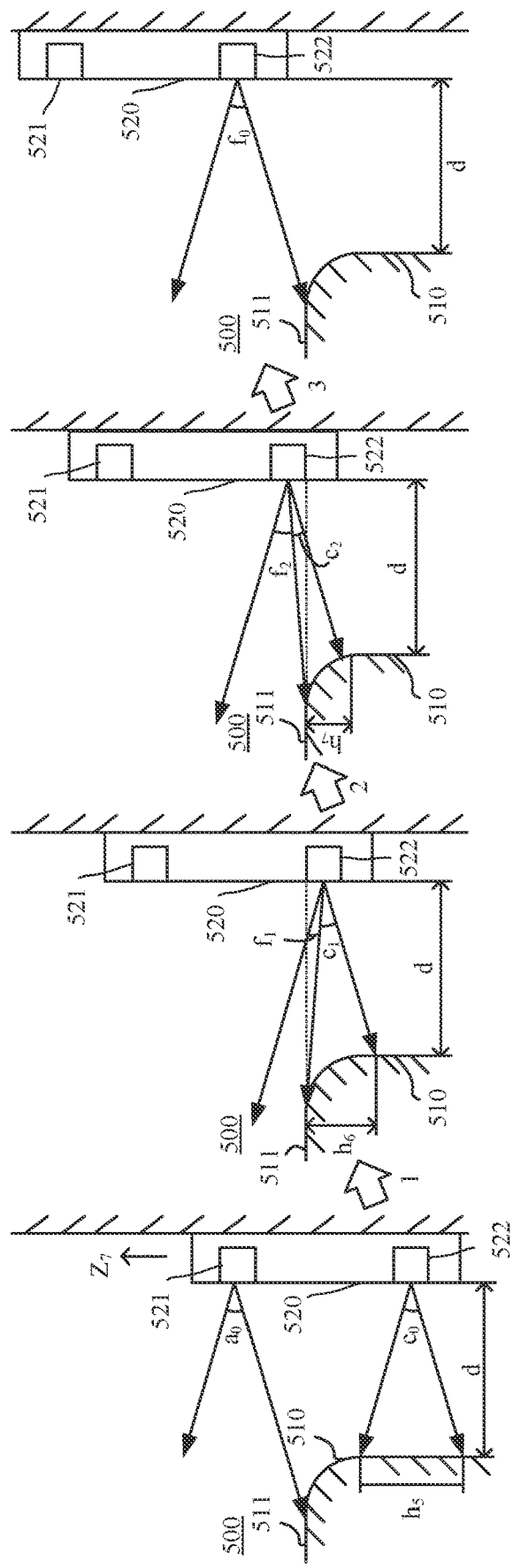
FIG. 17 is a schematic flowchart of movement of a movable assembly according to an embodiment of this application.

FIG. 17 is a schematic flowchart of movement of a movable assembly 520 according to an embodiment of this application.

A figure on the left side of an arrow 1 in FIG. 17 shows a schematic diagram in which the movable assembly 520 moves upward by a distance of $h_0$ from a start movement position. As shown in the figure, a light intensity of light that is reflected by a fixed assembly 510 and that is detected by a first optical proximity sensor 521 may be close to 0.

Light emitted by a second optical proximity sensor 522 may be irradiated on the fixed assembly 510. A total emission angle of the second optical proximity sensor 522 is $c_0$, and the fixed assembly 510 may reflect light from the second optical proximity sensor 522 back to the second optical proximity sensor 522. The second optical proximity sensor 522 may detect a light intensity of light incident on the second optical proximity sensor 522, and the light incident on the second optical proximity sensor 522 may include light reflected by the fixed assembly 510. It is assumed that in this case, the light intensity of the light that is reflected by the fixed assembly 510 and that is detected by the second optical proximity sensor 522 is I. Most light emitted by the second optical proximity sensor 522 may be reflected back to the second optical proximity sensor 522 by the fixed assembly 510. Therefore, a blocking angle of the second optical proximity sensor 522 may be $c_0$. Based on a spacing distance d between the fixed assembly 510 and the second optical proximity sensor 522 and the blocking angle c0 of the second optical proximity sensor 522, a blocking height $h_5=2d\times\tan(c_0/2)$ of the fixed assembly 510 in a second direction may be obtained.

Then, the movable assembly 520 continues moving upward in a direction $Z_7$ shown in the figure. A figure between the arrow 1 and an arrow 2 in FIG. 17 shows a position at which the second optical proximity sensor 522 is about to be exposed outside the electronic device 500.

A part of the light emitted by the second optical proximity sensor 522 may be irradiated on the fixed assembly 510, and the other part of the light cannot be irradiated on the fixed assembly 510. For example, a total emission angle of the second optical proximity sensor 522 is $c_0$, a blocking angle of the second optical proximity sensor 522 may be $c_1$, an open angle of the second optical proximity sensor 522 is $f_1$, and $c_0=c_1+f_1$.

Light irradiated on the fixed assembly 510 can be reflected by the fixed assembly 510 to the second optical proximity sensor 522. Light that is not irradiated on the fixed assembly 510 cannot return to the second optical proximity sensor 522.

Light that is detected by the second optical proximity sensor 522 and that is incident on the second optical proximity sensor 522 includes light reflected by the fixed assembly 510.

Based on a spacing distance d between the fixed assembly 510 and the second optical proximity sensor 522 and the blocking angle $c_1$ of the second optical proximity sensor 522, a blocking height $h_6=d\times\tan(c_0/2)-d\times\tan(c_1-c_0/2)$ of the fixed assembly 510 in the second direction may be obtained. In this case, it is assumed that a light intensity of light that is reflected by the fixed assembly 510 and that is detected by the second optical proximity sensor 522 is a second light intensity. A value of the second light intensity may be, for example, $I\times c_1/c_0$. Alternatively, the first light intensity value may be, for example, $I\times h_6/h_5$.

In this case, a movement distance of the movable assembly 520 in the second direction may be $h_5-h_6+h_0$.

Then, the movable assembly 520 continues moving upward. A figure between the arrow 2 and an arrow 3 in FIG. 6 shows a position at which the second optical proximity sensor 522 is about to be completely exposed outside the electronic device 500.

Apart of the light emitted by the second optical proximity sensor 522 may be irradiated on the fixed assembly 510, and the other part of the light cannot be irradiated on the fixed assembly 510. For example, a total emission angle of the second optical proximity sensor 522 is $c_0$, a blocking angle of the second optical proximity sensor 522 may be $c_2$, an open angle of the second optical proximity sensor 522 is $f_2$, and $c_0=c_2+f_2$, where $c_2<c_1$, and $f_2>f_1$.

Light irradiated on the fixed assembly 510 can be reflected by the fixed assembly 510 to the second optical proximity sensor 522. Light that is not irradiated on the fixed assembly 510 cannot return to the second optical proximity sensor 522.

The second optical proximity sensor 522 detects light that is incident on the second optical proximity sensor 522. The light that is incident on the second optical proximity sensor 522 includes light reflected by the fixed assembly 510. A light intensity of light reflected back to the second optical proximity sensor 522 by the fixed assembly 510 continues decreasing.

Based on a spacing distance d between the fixed assembly 510 and the second optical proximity sensor 522 and the blocking angle $c_2$ of the second optical proximity sensor 522, a blocking height $h_7 = d \times \tan(c_0/2) - d \times \tan(c_2 - c_0/2)$ of the fixed assembly 510 in the second direction may be obtained. $H_5 < h_4$, that is, the blocking height continues decreasing.

In this case, a movement distance of the movable assembly 520 in the second direction is $h_5 - h_7 + h_0$. In this case, a value of the second light intensity may be, for example, $I \times c_2/c_0$. Alternatively, the first light intensity value may be, for example, $I \times h_7/h_5$.

Then, the movable assembly 520 continues moving upward. A diagram on the right side of the arrow 3 in FIG. 6 shows a case in which the fixed assembly 510 can hardly block the light emitted by the second optical proximity sensor 522.

The light emitted by the second optical proximity sensor 522 can hardly be reflected back to the second optical proximity sensor 522 by the fixed assembly 510. In other words, a light intensity of light reflected back to the second optical proximity sensor 522 by the fixed assembly 510 may be ignored. In this case, a total emission angle of the second optical proximity sensor 522 is $c_0$, an open angle of the second optical proximity sensor 522 may be $c_0$, and a blocking angle of the second optical proximity sensor 522 may be approximately denoted as 0.

Based on the spacing distance d between the fixed assembly 510 and the second optical proximity sensor 522 and the blocking angle of the second optical proximity sensor 522, it may be learned that a blocking height of the fixed assembly 510 in the second direction may be approximately denoted as 0.

In this case, the movable assembly 520 moves at least $h_5 + h_0$ in the second direction.

It can be learned from the example shown in FIG. 17 that an effective control stroke of the movable assembly 520 can be increased by disposing the plurality of optical proximity sensors on the movable assembly 520. The effective control stroke of the movable assembly 520 may be obtained by accumulating a plurality of effective control strokes of the plurality of optical proximity sensors on the movable assembly 520.

Figure 18:
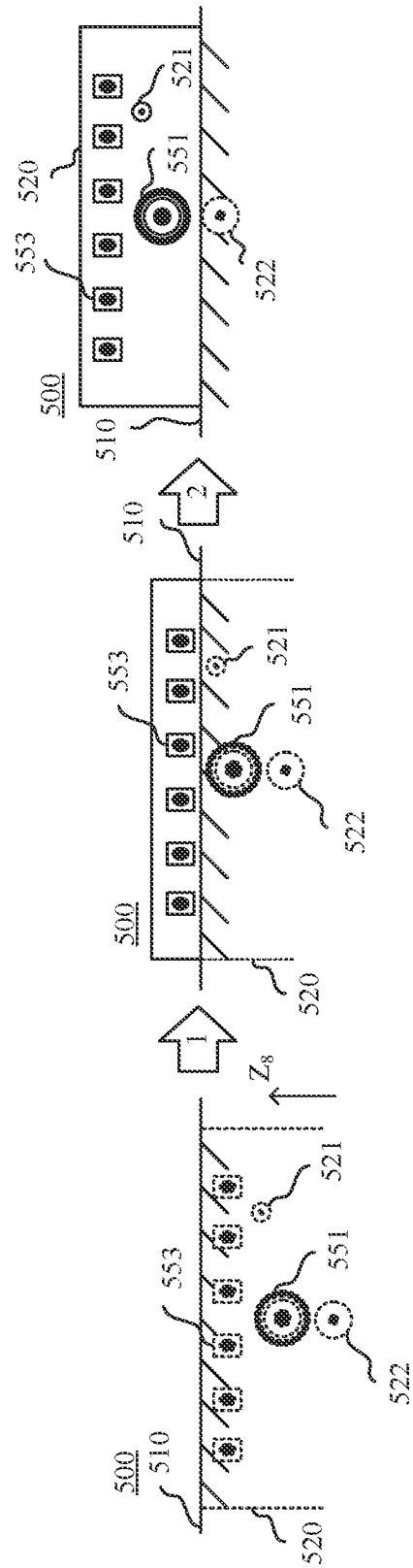
FIG. 18 is a schematic diagram of an application scenario of a control method for a movable assembly according to an embodiment of this application.

With reference to FIG. 18, the following describes an application scenario of a control method for a movable assembly 520 according to an embodiment of this application. An electronic device 500 may include a fixed assembly 510 and the movable assembly 520.

In an example, a figure on the left side of an arrow 1 in FIG. 18 shows a schematic diagram of a structure of the movable assembly 520 before the movable assembly 520 starts to move. The movable assembly 520 may include a first optical proximity sensor 521, a second optical proximity sensor 522, a camera 551, and one or more microphones 553. Optionally, a lowest point of the first optical proximity sensor 521 in a second direction is higher than a lowest point of the camera 551 in the second direction, and a highest point of the first optical proximity sensor 521 in the second direction is lower than a lowest point of the microphone 553 in the second direction. A highest point of the second optical proximity sensor 522 in the second direction is lower than a lowest point of the camera 551 in the second direction. A dashed line in FIG. 18 represents an area that is of the movable assembly 520 and that is not exposed outside the electronic device 500, and a solid line in FIG. 18 represents an area that is of the movable assembly 520 and that is exposed outside the electronic device 500. A direction $Z_8$ in FIG. 18 may represent a movement direction of the movable assembly 520. In other words, the movable assembly 520 may move in the second direction. The movable assembly 520 may reach a first target position after moving. In this case, a first light intensity reaches a first preset light intensity value. A figure between the arrow 1 and an arrow 2 in FIG. 18 shows a schematic diagram of a structure of the movable assembly 520 that stops moving at the first target position. It can be learned that the microphone 553 originally retracted inside the electronic device 500 is exposed outside the electronic device 500, and the first optical proximity sensor 521, the camera 551, and the second optical proximity sensor 522 on the movable assembly 520 are still retracted inside the electronic device 500. The movable assembly 520 continues moving, and may reach a third target position. In this case, a second light intensity reaches a third preset light intensity value. A figure on the right side of the arrow 2 in FIG. 18 shows a schematic diagram of a structure of the movable assembly 520 that stops moving at the third target position. It can be learned that the microphone 553, the camera 551, and the first optical proximity sensor 521 that originally retracted inside the electronic device 500 are all exposed outside the electronic device 500. Optionally, the second optical proximity sensor 522 may still be retracted inside the electronic device 500.

Figure 19:
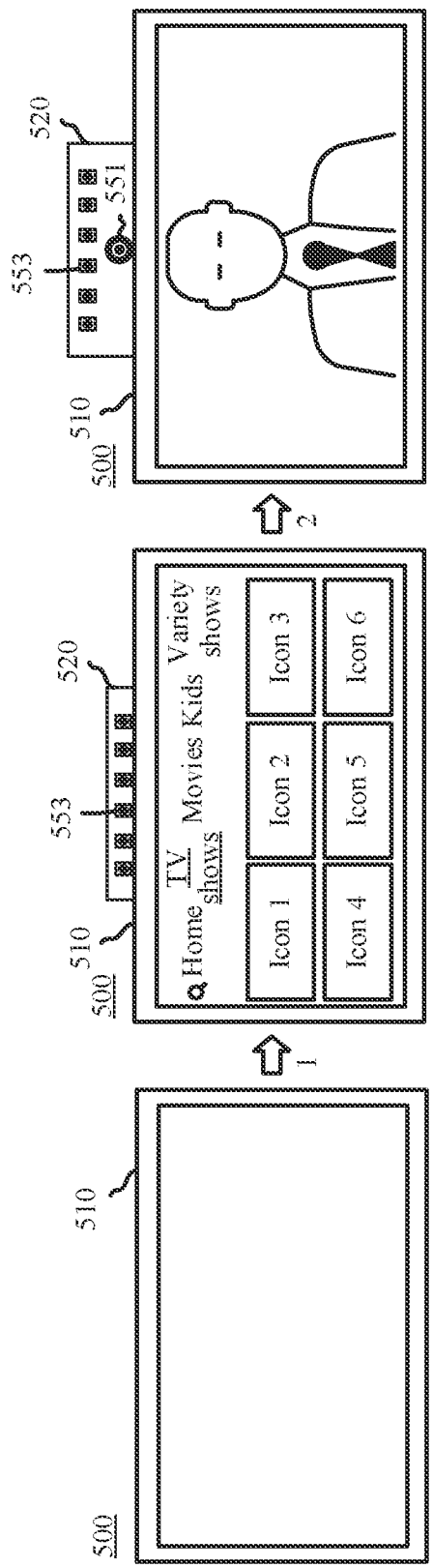
FIG. 19 is a schematic diagram of an application scenario of a control method for a movable assembly according to an embodiment of this application.

With reference to FIG. 19, the following describes an application scenario of a control method for a movable assembly 520 according to an embodiment of this application. An electronic device 500 may be, for example, a television (or a smart screen). The electronic device 500 may include a fixed assembly 510 and the movable assembly 520. The fixed assembly 510 may be, for example, a side surface surrounding a display. The movable assembly 520 may include a first optical proximity sensor (not shown in FIG. 19), a second optical proximity sensor (not shown in FIG. 19), a camera 551, and one or more microphones 553.

First, when the electronic device 500 is not powered on, the movable assembly 520 may be at a start position before movement. A figure on the left side of an arrow 1 in FIG. 19 shows a schematic diagram of a structure of the electronic device 500. It can be learned from the figure that in this case, no electronic component is exposed outside the electronic device 500.

Then, a user may turn on the electronic device 500, and the electronic device 500 may have a voice remote control function. Therefore, after the electronic device 500 is powered on, the electronic device 500 may drive the movable assembly 520 to move, so that the microphone 553 carried by the movable assembly 520 is exposed outside the electronic device 500. As shown in a figure between the arrow 1 and an arrow 2 in FIG. 19, the user may observe a menu page displayed by the electronic device 500, and speak a voice instruction. The microphone 553 on the movable assembly 520 may record the voice instruction of the user, so that the electronic device 500 performs an operation related to the voice instruction. Optionally, to monitor the voice instruction of the user in real time, the microphone 553 carried by the movable assembly 520 may be always exposed outside the electronic device 500.

For example, the menu page may include at least one paid video. The user selects a paid video on the menu page, and instructs, in a form of a voice instruction, the electronic device 500 to play the video. Then, identity verification may be performed in a facial recognition manner, to pay for the paid video. As shown in a figure on the right side of the arrow 2 in FIG. 19, the electronic device 500 may drive, based on a voice instruction of the user, the movable assembly 520 to continue moving, so that the camera 551 carried by the movable assembly 520 is exposed outside the electronic device 500, to perform an identity verification operation.

Figure 20:
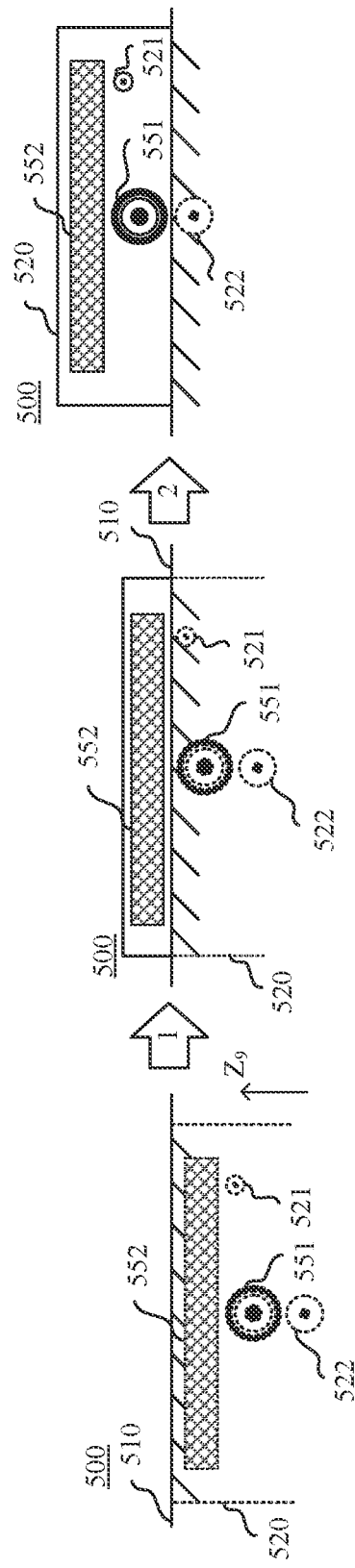
FIG. 20 is a schematic diagram of an application scenario of a control method for a movable assembly according to an embodiment of this application.

With reference to FIG. 20, the following describes an application scenario of a control method for a movable assembly 520 according to an embodiment of this application. An electronic device 500 may include a fixed assembly 510 and the movable assembly 520.

In an example, a figure on the left side of an arrow 1 in FIG. 20 shows a schematic diagram of a structure of the movable assembly 520 before the movable assembly 520 starts to move. The movable assembly 520 may include a first optical proximity sensor 521, a second optical proximity sensor 522, a camera 551, and a speaker 552. Optionally, a lowest point of the first optical proximity sensor 521 in a second direction is higher than a highest point of the camera 551 in the second direction, and a highest point of the second optical proximity sensor 522 in the second direction is lower than a lowest point of the speaker 552 in the second direction. A dashed line in FIG. 20 represents an area that is of the movable assembly 520 and that is not exposed outside the electronic device 500, and a solid line in FIG. 20 represents an area that is of the movable assembly 520 and that is exposed outside the electronic device 500. A direction $Z_9$ in FIG. 20 may represent a movement direction of the movable assembly 520. In other words, the movable assembly 520 may move in the second direction. The movable assembly 520 may reach a first target position after moving. In this case, a first light intensity reaches a first preset light intensity value. A figure between the arrow 1 and an arrow 2 in FIG. 20 shows a schematic diagram of a structure of the movable assembly 520 that stops moving at the first target position. It can be learned that the speaker 552 originally retracted inside the electronic device 500 is exposed outside the electronic device 500, and the camera 551, the first optical proximity sensor 521, and the second optical proximity sensor 522 on the movable assembly 520 are still retracted inside the electronic device 500. The movable assembly 520 continues moving, and may reach a third target position. In this case, a second light intensity reaches a third preset light intensity value. A figure on the right side of the arrow 2 in FIG. 20 shows a schematic diagram of a structure of the movable assembly 520 that stops moving at the third target position. It can be learned that the speaker 552, the camera 551, and the first optical proximity sensor 521 that originally retracted inside the electronic device 500 are all exposed outside the electronic device 500. Optionally, the second optical proximity sensor 522 may still be retracted inside the electronic device 500.

Figure 21:
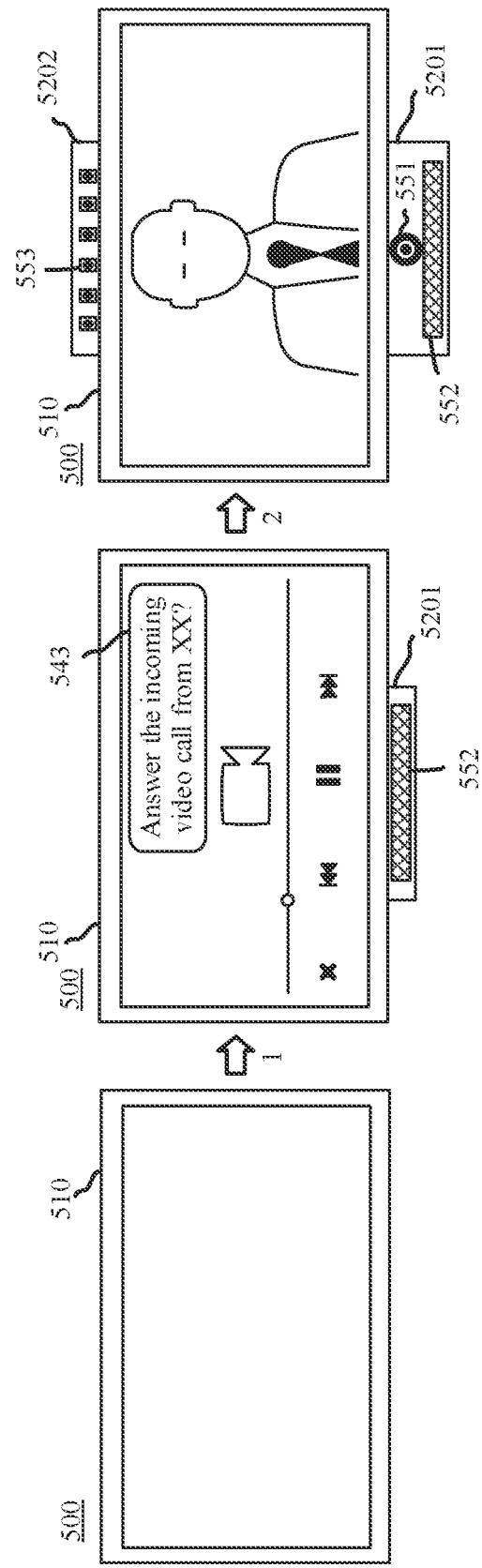
FIG. 21 is a schematic diagram of an application scenario of a control method for a movable assembly according to an embodiment of this application.

With reference to FIG. 21, the following describes an application scenario of a control method for a movable assembly 520 according to an embodiment of this application. An electronic device 500 may be, for example, a television (or a smart screen). The electronic device 500 may include a fixed assembly 510, a movable assembly 5201, and a movable assembly 5202. The fixed assembly 510 may be, for example, a side surface surrounding a display. The movable assembly 5201 may include a first optical proximity sensor (not shown in FIG. 21), a second optical proximity sensor (not shown in FIG. 21), a camera 551, and a speaker 552. The movable assembly 5202 may include one or more microphones 553.

First, when the electronic device 500 is not powered on, both the movable assembly 5201 and the movable assembly 5202 may be at a start position before movement. A figure on the left side of an arrow 1 in FIG. 21 shows a schematic diagram of a structure of the electronic device 500. It can be learned from the figure that in this case, no electronic component is exposed outside the electronic device 500.

Then, a user may turn on the electronic device 500, and play a video. As shown in a figure between the arrow 1 and an arrow 2 in FIG. 21, the electronic device 500 may drive the movable assembly 5201 to move, so that the speaker 552 carried by the movable assembly 5201 is exposed outside the electronic device 500, to play audio data corresponding to the video.

Then, the electronic device 500 receives a video chat request. The electronic device 500 may display prompt information, to ask the user whether to answer the video chat. The user can choose to answer the video chat. The electronic device 500 may drive the movable assembly 5201 to continue moving, so that the speaker 552 carried by the movable assembly 5201 can be exposed outside the electronic device 500. In addition, the electronic device 500 may drive the movable assembly 5202 to move, so that the microphone 553 carried by the movable assembly 5202 can be exposed outside the electronic device 500. As shown in a figure on the right side of the arrow 2 in FIG. 21, the camera 551 on the movable assembly 5201 may shoot a scene in front of the electronic device 500, for example, may shoot a portrait in front of the electronic device 500. The microphone 553 on the movable assembly 5202 may record a voice of the user. The electronic device 500 may implement a video chat function based on video data collected by the camera 551 and audio data collected by the microphone 553.

It may be understood that, to implement the foregoing functions, the electronic device includes corresponding hardware and/or software modules for performing the functions. Algorithm steps in the examples described with reference to embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In the embodiments, the electronic device may be divided into functional modules based on the foregoing method examples. For example, each functional module corresponding to each function may be obtained through division, or two or more functions may be integrated into one processing module. The integrated module may be implemented in a form of hardware. It should be noted that, in embodiments, division into modules is an example and is merely logical function division. During actual implementation, there may be another division manner.

Figure 22:
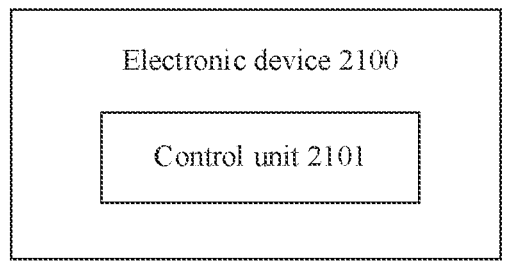
FIG. 22 is a schematic block diagram of an electronic device according to an embodiment of this application.

When each function module corresponding to each function is obtained through division, FIG. 22 is a schematic diagram of possible composition of an electronic device 2100 in the foregoing embodiments. As shown in FIG. 22, the electronic device 2100 may include a control unit 2101.

The control unit 2101 may be configured to support the electronic device 2100 in performing the steps 701, 702, and the like, and/or another process used for the technology described in this specification. For example, the processor in FIG. 1 may be configured to implement a function of the control unit 2101.

It should be noted that all related content of the steps in the foregoing method embodiments may be cited in function description of corresponding functional modules. Details are not described herein again.

The electronic device provided in this embodiment is configured to perform the control method for a movable assembly. Therefore, an effect same as the effect of the foregoing implementation methods can be achieved.

When an integrated unit is used, the electronic device may include a processing module, a storage module, and a communications module. The processing module may be configured to control and manage actions of the electronic device, for example, may be configured to support the electronic device to perform the steps performed by the foregoing units. The storage module may be configured to support the electronic device to store program code, data, and the like. The communications module may be configured to support communications between the electronic device and another device.

The processing module may be a processor or a controller, and may implement or execute various example logical blocks, modules, and circuits described with reference to content disclosed in this application. The processor may alternatively be a combination of processors implementing a computing function, for example, a combination of one or more microprocessors or a combination of a digital signal processor (digital signal processor, DSP) and a microprocessor. The storage module may be a memory. The communications module may be specifically a device that interacts with another electronic device, such as a radio frequency circuit, a Bluetooth chip, or a Wi-Fi chip.

In an embodiment, when the processing module is a processor and the storage module is a memory, the electronic device in this embodiment may be a device having the structure shown in FIG. 1.

This embodiment further provides a chip system. The chip system includes at least one processor. When a program instruction is executed in the at least one processor, the chip system is enabled to perform the foregoing related method steps, to implement the control method for a movable assembly in the foregoing embodiments.

This embodiment further provides a computer storage medium. The computer storage medium stores computer instructions. When the computer instructions are run on the electronic device, the electronic device is enabled to perform the related method steps, to implement the control method for a movable assembly in the foregoing embodiments.

This embodiment further provides a computer program product. When the computer program product is run on a computer, the computer is enabled to perform the foregoing related steps, to implement the control method for a movable assembly in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the control method for a movable assembly in the foregoing method embodiments.

A person of ordinary skill in the art may be aware that, in combination with the examples described in embodiments disclosed in this specification, units and algorithm steps may be implemented by electronic hardware or a combination of computer software and electronic hardware. Whether functions are performed in a hardware or software manner depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:
   a fixed assembly;
   a movable assembly spaced apart from the fixed assembly in a first direction by a preset spacing distance, wherein the movable assembly is movable on a target plane, wherein the target plane is disposed in parallel relative to the fixed assembly, wherein the target plane is disposed perpendicularly relative to the first direction, wherein a movement displacement of the movable assembly is in a second direction, wherein the second direction is disposed perpendicularly relative to the first direction, and wherein the second direction is disposed in parallel relative to the target plane; and
   a first optical proximity sensor is disposed on the movable assembly,
   wherein the first optical proximity sensor is configured to emit first light towards the fixed assembly and detect a first light intensity of second light incident on the first optical proximity sensor,
   wherein the second light is from the first optical proximity sensor and is reflected by the fixed assembly,
   wherein when the movable assembly is located at a first movement position in the second direction, the first light intensity has a first light intensity value,
   wherein when the movable assembly is located at a second movement position in the second direction, the first light intensity has a second light intensity value, and
   wherein the first movement position and the second movement position are staggered in the second direction.

2. The electronic device of claim 1, wherein the first light intensity determines a blocking angle of the first optical proximity sensor, and wherein in a process in which the movable assembly moves from the first movement position to the second movement position, a displacement of the movable assembly in the second direction is based on the blocking angle and the preset spacing distance.

3. The electronic device of claim 1, wherein the first light intensity is configured to control the movable assembly to move to a first target position, wherein the electronic device further comprises a second optical proximity sensor disposed on the movable assembly, wherein a first position of the second optical proximity sensor in the second direction is different from a second position of the first optical proximity sensor in the second direction, wherein the second optical proximity sensor is configured to emit third light towards the fixed assembly and detect a second a light intensity of fourth light incident on the second optical proximity sensor, wherein the fourth light is from the second optical proximity sensor and is reflected by the fixed assembly, wherein the second light intensity of the fourth light controls the movable assembly to move to a second target position, and wherein the first target position and the second target position are staggered in the second direction.

4. The electronic device of claim 1, wherein the electronic device further comprises an electronic component disposed on the movable assembly, wherein the movable assembly is configured to move relative to the fixed assembly to expose the electronic component outside the electronic device or retracts the electronic component inside the electronic device, and wherein the first light intensity is greater than 0 and less than a maximum value when a lowest position of the electronic component in the second direction is flush with a highest position of the fixed assembly in the second direction.

5. The electronic device of claim 1, further comprising an electronic component disposed on the movable assembly, wherein movement the movable assembly relative to the fixed assembly exposes the electronic component outside the electronic device or retracts the electronic component inside the electronic device, and wherein a lowest position of the electronic component in the second direction is lower than a highest position of the fixed assembly in the second direction when the first light intensity reaches a maximum value.

6. The electronic device of claim 1, further comprising an ambient light sensor is disposed on the movable assembly, wherein the ambient light sensor is configured to detect a second light intensity of an ambient environment of the ambient light sensor, and wherein a first position of the ambient light sensor is flush with a second position of the first optical proximity sensor in the second direction.

7. A control method for a movable assembly, the control method comprising:
   controlling the movable assembly to move on a target plane, wherein the target plane is disposed in parallel relative to a fixed assembly, wherein the movable assembly is spaced apart from the fixed assembly in a first direction by a preset spacing distance, wherein the target plane is disposed perpendicularly relative to the first direction, wherein a movement displacement of the movable assembly is in a second direction, wherein the second direction is disposed perpendicularly relative to the first direction, wherein the second direction is disposed in parallel relative to the target plane, wherein the movable assembly comprises a first optical proximity sensor, wherein the first optical proximity sensor is configured to emit first light and detect a first light intensity of second light incident on the first optical proximity sensor, wherein at least a first part of the first light is irradiated on the fixed assembly, and wherein the second light is from the first optical proximity sensor and is reflected by the fixed assembly; and
   controlling the movable assembly to stop moving when the first light intensity reaches a first preset light intensity value to maintain the movable assembly at a first target position in the second direction.

8. The control method of claim 7, wherein before controlling the movable assembly to stop moving, the control method further comprises determining, based on the first light intensity, the movement displacement of the movable assembly relative to the fixed assembly in the second direction, wherein controlling the movable assembly to stop moving comprises controlling the movable assembly to stop moving when the movement displacement reaches a target displacement threshold, and wherein the first light intensity reaches the first preset light intensity value when the movement displacement reaches the target displacement threshold.

9. The control method of claim 4, wherein determining the movement displacement comprises:
   determining, based on the first light intensity, a blocking angle of the first optical proximity sensor; and
   determining, based on the blocking angle and the preset spacing distance, movement displacement.

10. The control method of claim 7, wherein before controlling the movable assembly to move on the target plane, the control method further comprises determining, in response to a first operation, that the movable assembly is ready to stay at the first target position, and wherein after controlling the movable assembly to stop moving, the control method further comprises:

determining, in response to a second operation, that the movable assembly is ready to stay at a second target position;

controlling the movable assembly to move on the target plane; and controlling the movable assembly to stop moving to maintain the movable assembly at the second target position when the first light intensity reaches a second preset light intensity value.

11. The control method of claim 7, wherein the movable assembly further comprises a second optical proximity sensor, wherein a first position of the second optical proximity sensor in the second direction is different from a second position of the first optical proximity sensor in the second direction, wherein the second optical proximity sensor is configured to emit third light and detect a second light intensity of fourth light incident on the second optical proximity sensor, wherein at least a second part of the third light is irradiated on the fixed assembly, wherein the fourth light is from the second optical proximity sensor and is reflected by the fixed assembly, and wherein before controlling the movable assembly to move on the target plane, the control method further comprises determining, in response to a first operation, that the movable assembly is ready to stay at the first target position, and wherein after controlling the movable assembly to stop moving, the control method further comprises:

determining, in response to a third operation, that the movable assembly is ready to stay at a third target position;

controlling the movable assembly to move on the target plane; and controlling the movable assembly to stop moving to maintain the movable assembly at the third target position when the second light intensity reaches a second preset light intensity value.

12. The control method of claim 7, wherein before controlling the movable assembly to stop moving, the control method further comprises:

obtaining a moving time of the movable assembly; and determining that the movable assembly moves abnormally when the moving time exceeds a preset time threshold.

13. The control method of claim 12, further comprising displaying target indication information indicating that the movable assembly moves abnormally.

14. The control method of claim 7, wherein the movable assembly further comprises an ambient light sensor, wherein the ambient light sensor is configured to detect a second light intensity of an ambient environment of the ambient light sensor, wherein a first position of the ambient light sensor is flush with a second position of the first optical proximity sensor in the second direction, and wherein controlling the movable assembly to stop moving comprises controlling, based on the first light intensity and the second light intensity, the movable assembly to stop moving.

15. A computer program product comprising instructions on a non-transitory computer-readable medium that, when executed by a processor cause an electronic device to:

control a movable assembly to move on a target plane, wherein the target plane is disposed in parallel relative to a fixed assembly, wherein the movable assembly is spaced apart from the fixed assembly in a first direction by a preset spacing distance, wherein the target plane is disposed perpendicularly relative to the first direction, wherein a movement displacement of the movable assembly is in a second direction, wherein the second direction is disposed perpendicularly relative to the first direction, wherein the second direction is disposed in parallel relative to the target plane, wherein the movable assembly comprises a first optical proximity sensor, wherein the first optical proximity sensor is configured to emit first light and detect a first light intensity of second light incident on the first optical proximity sensor, wherein at least a first part of the first light is irradiated on the fixed assembly, and wherein the second light is from the first optical proximity sensor and is reflected by the fixed assembly; and control the movable assembly to stop moving when the first light intensity reaches a first preset light intensity value to maintain the movable assembly at a first target position in the second direction.

16. The computer program product of claim 15, wherein before controlling the movable assembly to stop moving, the processor further executes the instructions to determine, based on the first light intensity, the movement displacement of the movable assembly relative to the fixed assembly in the second direction, wherein controlling the movable assembly to stop moving comprises controlling the movable assembly to stop moving when the movement displacement reaches a target displacement threshold, and wherein the first light intensity reaches the first preset light intensity value when the movement displacement reaches the target displacement threshold.

17. The computer program product of claim 16, wherein the processor further executes the instructions to:

determine, based on the first light intensity a blocking angle of the first optical proximity sensor; and determine, based on the blocking angle and the preset spacing distance, the movement displacement.

18. The computer program product of claim 15, wherein before controlling the movable assembly to move on the target plane, the processor further executes the instructions to determine, in response to a first operation, that the movable assembly is ready to stay at the first target position, and after the movable assembly stays at the first target position, the processor further executes the instructions to:

determine, in response to a second operation, that the movable assembly is ready to stay at a second target position;

control the movable assembly to move on the target plane; and control the movable assembly to stop moving to maintain the movable assembly at the second target position when the first light intensity reaches a second preset light intensity value.

19. The computer program product of claim 15, wherein the movable assembly further comprises a second optical proximity sensor, wherein a first position of the second optical proximity sensor in the second direction is different from a second position of the first optical proximity sensor in the second direction, wherein the second optical proximity sensor is configured to emit third light and detect a second light intensity of fourth light incident on the second optical proximity sensor, wherein at least a second part of the second light is irradiated on the fixed assembly, wherein the fourth light comprises the third light that is from the second optical proximity sensor and is reflected by the fixed assembly, and wherein before controlling the movable assembly to move on the target plane, the processor further executes the instructions to determine, in response to a first operation, that the movable assembly is ready to stay at the first target position, and wherein after the movable assembly stays at the first target position, the processor further executes the instructions to:
  determine, in response to a third operation, that the movable assembly is ready to stay at a third target position;
  control the movable assembly to move on the target plane; and
  control the movable assembly to stop moving to maintain the movable assembly at the third target position when the second light intensity of the fourth light reaches a second preset light intensity value.

20. The computer program product of claim 15, wherein before controlling the movable assembly to stop moving, the processor further executes the instructions to:
  obtain a moving time of the movable assembly; and
  determine that the movable assembly moves abnormally when the moving time exceeds a preset time threshold.

* * * * *

UNITED STATES PATENT AND TRADEMARK OFFICE
CERTIFICATE OF CORRECTION

Page 1 of 1

PATENT NO. : 12,035,032 B2
APPLICATION NO. : 17/916391
DATED : July 9, 2024
INVENTOR(S) : Shengcai Liu and Shuqiang Gong It is certified that error appears in the above-identified patent and that said Letters Patent is hereby corrected as shown below:

In the Claims

Claim 3, Column 45, Line 49: "towards the fixed assembly and detect a second a light" should read "towards the fixed assembly and detect a second light"

Claim 6, Column 46, Line 12: "ambient light sensor is disposed on the movable assembly," should read "ambient light sensor disposed on the movable assembly,"

Signed and Sealed this
Twenty-fourth Day of September, 2024

Katherine Kelly Vidal
*Director of the United States Patent and Trademark Office*